(12) United States Patent
Brassea-Flores

(10) Patent No.: US 6,223,532 B1
(45) Date of Patent: May 1, 2001

(54) MULTICYCLE ENERGY RIFFLE

(76) Inventor: Angel Brassea-Flores, P.O. Box 2186, Calexico, CA (US) 92232

( * ) Notice: Subject to any disclaimer, the term of this patent is extended or adjusted under 35 U.S.C. 154(b) by 0 days.

(21) Appl. No.: 09/283,764

(22) Filed: Apr. 1, 1999

(51) Int. Cl.[7] ..................................... F03C 1/00
(52) U.S. Cl. ............................. 60/495; 60/641.6; 60/651; 60/671
(58) Field of Search ............................... 60/641.1, 641.6, 60/651, 671, 495, 496

(56) References Cited

U.S. PATENT DOCUMENTS

| | | | |
|---|---|---|---|
| 4,437,308 | * | 3/1984 | Fischer ............................... 60/651 X |
| 4,478,238 | * | 10/1984 | Maddox et al. ...................... 137/171 |
| 4,779,006 | * | 10/1988 | Wortham ................................ 290/55 |
| 4,788,824 | * | 12/1988 | Spurr et al. ........................ 60/651 X |
| 5,685,147 | * | 11/1997 | Brassea ................................... 60/496 |
| 5,899,066 | * | 5/1999 | Brassea-Flores ...................... 60/496 |

* cited by examiner

Primary Examiner—Hoang Nguyen

(57) ABSTRACT

A method and apparatuses used in several interdependent energy transducing [energy] passageways. Each passageway uses [at least one] flow generators such as mechanical compressors, direct and indirect gravity [upon the generative fluid], condensing, [means and] heating [means], absorption [means], adapted turbo-jet engines, [flow] generation and storage of hydrogen and oxygen; uses vehicles [means] to control and direct the generative fluid such as pipes, valves, a liquid medium, nozzles, hoods, channels, etc. The flow generators drive the generative fluid through the controlling directing vehicles [means] thus producing different manifestations of energy which are converted into usable energy [(including hydrogen and oxygen)] by [transducing] artifacts [means] such as rotative-propulsion turbines, vortex turbines, train-turbines, conventional turbines generators, adapted turbo-jet engines and by artifacts [means] for producing hydrogen and oxygen. The power of hydrogen and oxygen impelled by liquid is also transduced, stored and optionally [later] burned for additional transduction.

21 Claims, 11 Drawing Sheets

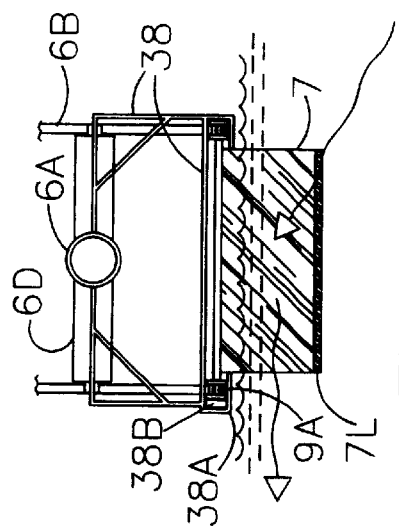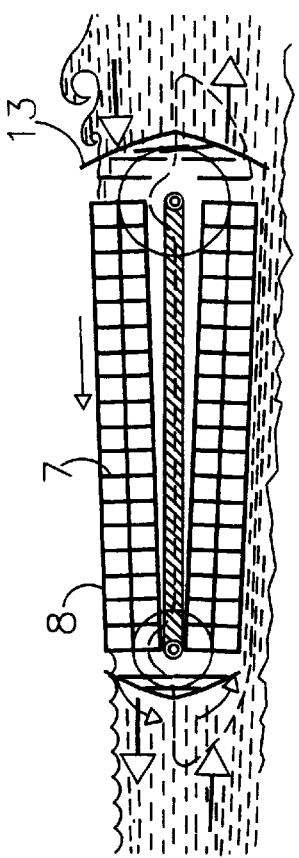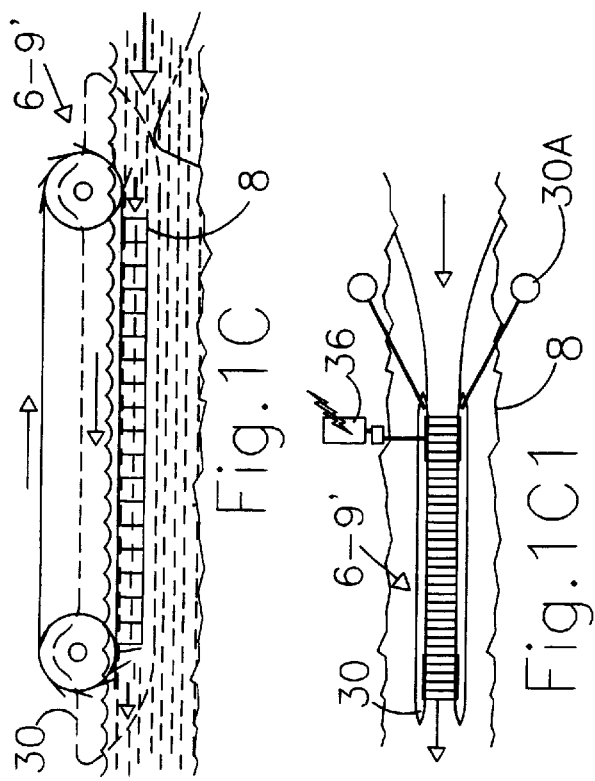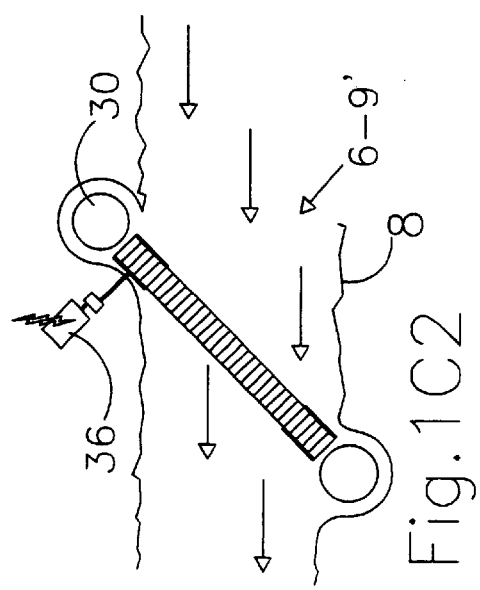

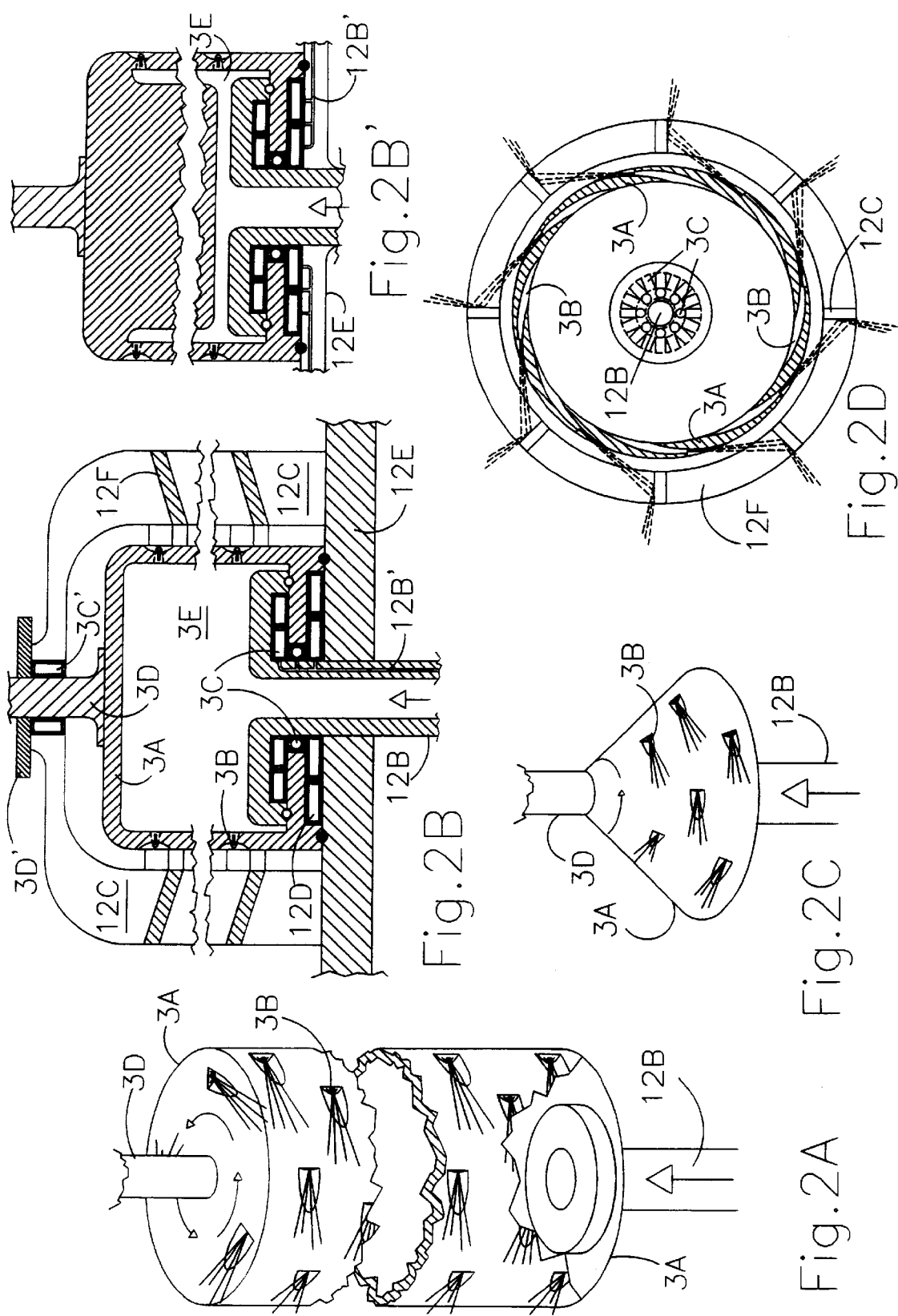

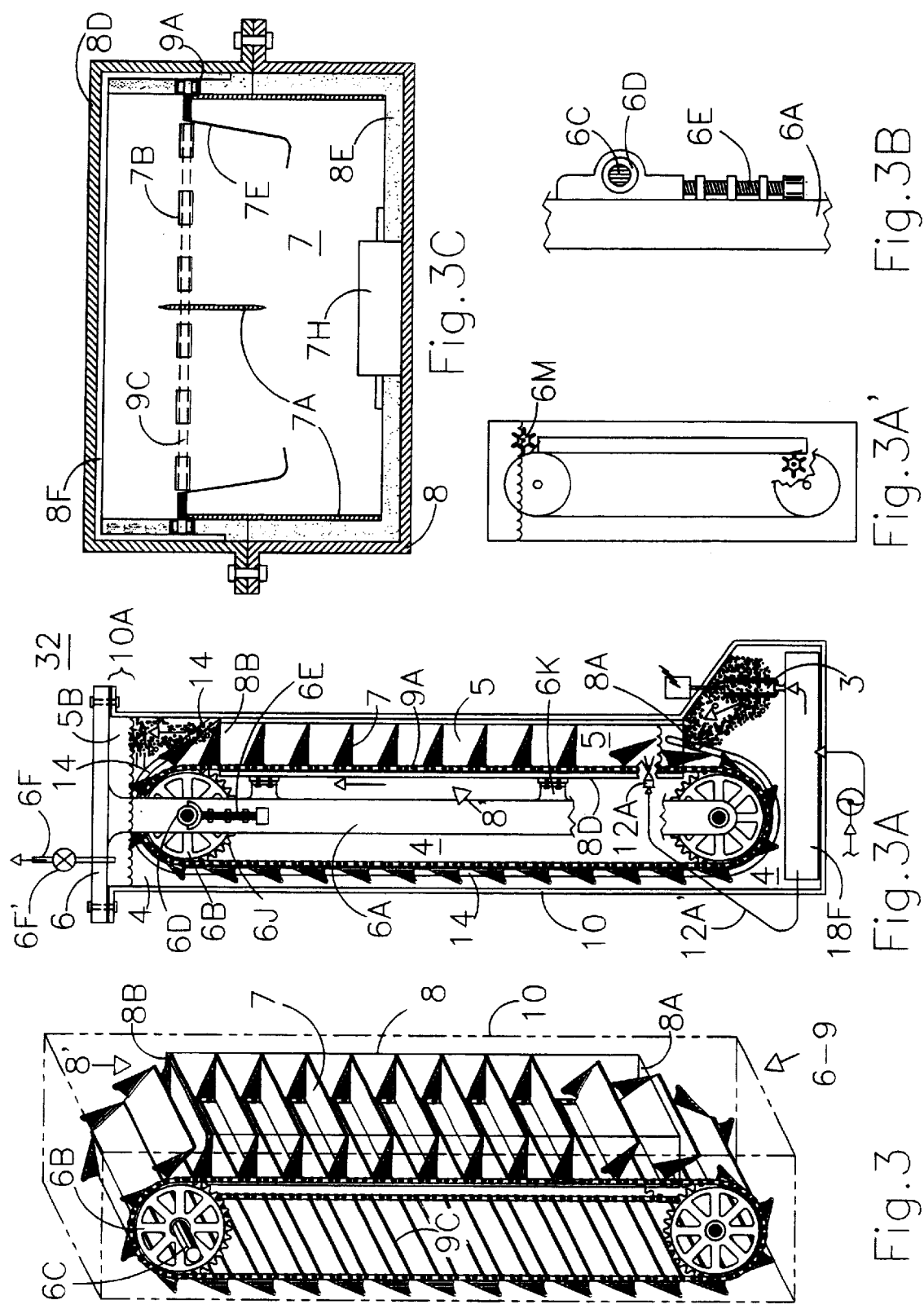

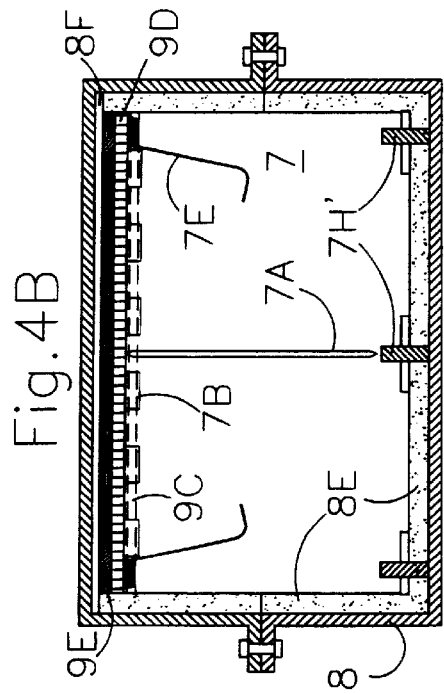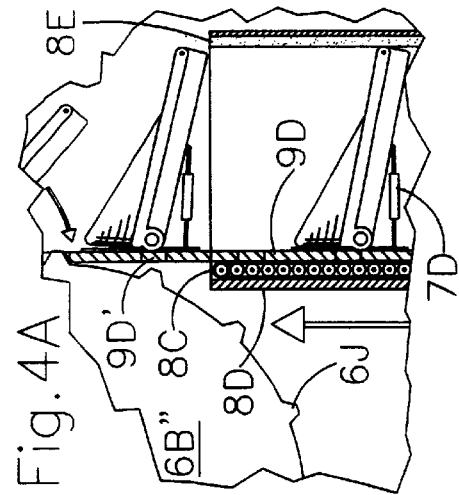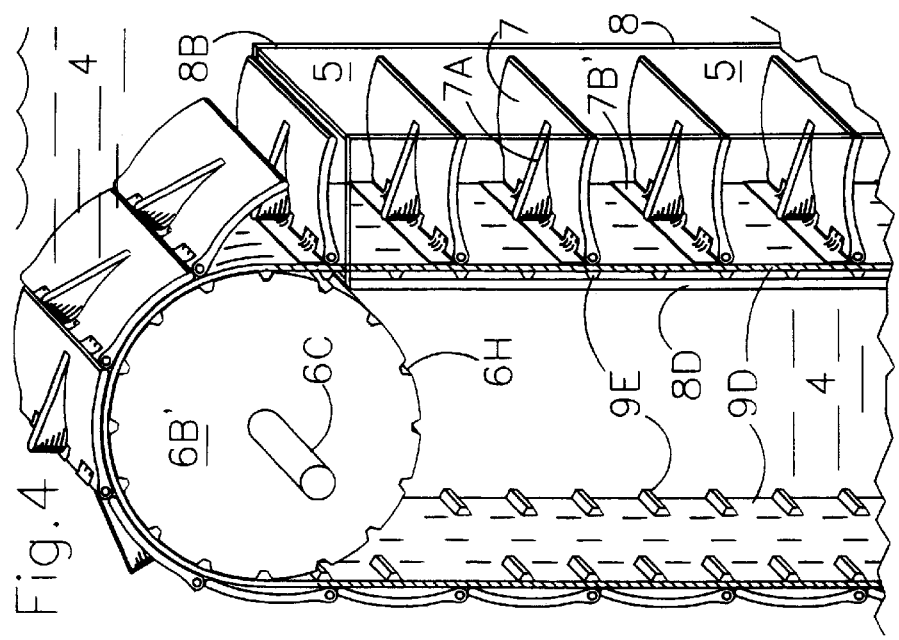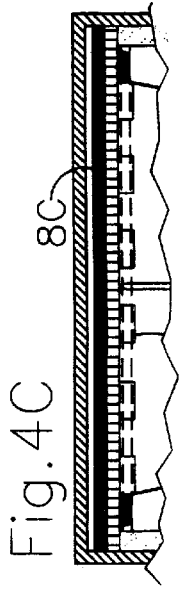

MULTICYCLE ENERGY RIFFLE

BACKGROUND

This invention uses the flexible or stretchable chambers for energy conversion and storage, conventional turbines, buoyancy power, refrigeration and absorption of applicant's former patent (AFP) 5 685 147 (1997) and pending divisional patent application.

This invention relates to transduction of different manifestations of energy resembling the natural cycle of water, particularly using at least one artifact for transducing the buoyancy of a working generative fluid (Gfluid) rising within a heavier fluid, and the power of falling Gfluid in liquid state.

Thermal differentials and gravity are important activators of fluid or flow generators which activate or assist activation of the Gfluid in at least one passageway riffled by turbines for converting the different manifestations of energy into rotative energy, electric energy and energy as hydrogen/oxygen. The Gfluid can be controlled in gaseous state as to produce "heads" of gaseous conventional pressure.

More particularly, the system essentially relates to the combination of: generative injection of Gfluid into an upwardly impelling liquid 4 by a sub-aqueous rotative propulsion turbine (RPT) 3, transduction of buoyancy by flotation turbines or duct-floturbines 6–9 (page 12), to transduction of conventional pressure though conventional turbines for gaseous fluid in contact with a liquid or gas/vapor turbines (GV-Turbines), to transduction of gravitation on the Gfluid in liquid state falling through and using a hydroturbine 6–9' and to generative production of hydrogen and oxygen by electrolysis, using also sub-aqueous turbines and conventional GV-Turbines. Definitions are positioned just after the summery.

PRIOR ART

With no doubt, nowadays it is widely recognized that usable, cheap, green energy is a great necessity. Most traditional methods for producing usable energy still have to be environmentally safe, including traditional hydro-power which floods vast lands by using dams. Known methods of energy generation can be enhanced or partially substituted at least by the use of sub-aqueous rotative propulsion and buoyancy transduced by relatively cheap and simple sub-aqueous turbines, This is possible in part since the harnessing of sub-aqueous powers do not harm the conventional pressure that spins conventional gas/vapor turbines.

Related inventions as U.S. Pat. Nos. 4,498,294 to Everett (1985) and 4,028,893 to Shaw (1977), closer to this invention, with no practical result have tried to harness conveniently buoyancy through the liquid. In general, the prior art buoyancy transducers are limited by their design and would spend more energy than the energy produced. Everett's and Shaw's are the patents more similar to applicant's disclosure; but at least their way of Gfluid injection, their buckets shape or design and their thermal manipulation make their systems uncompetitive.

Modern turbo-compressors as Adapted Turbo-Jet (ATJEs) generate usable energy utilizing an immediate first turbine for its exhaust and another combined turbine rotated by the expanded Gfluid generated by the high heat of the exhaust. Nevertheless, neither the heat of the finally discarded exhaust gases nor the heat of the exhaust steam is harnessed by floturbines. In conventional transduction, the fall of liquefied water vapor is not being transduced by a hydroturbine.

OBJECTS AND ADVANTAGES OF APPLICANT'S INVENTION

Applicant's invention in turn, overcomes above pitfalls, broads the use of train-turbines and couples sub-aqueous manifestations of energy with conventional gas pressure of conventional thermal-energy plants.

Accordingly, several objects and advantages of applicant's invention are:

To provide a combination of cycles and apparatuses of cooperative performance to cleanly and competitively generate usable energy.

To create a current of power which can be transduced at several points such that an energy transducing riffle is formed to take advantage of different manifestations of energy along the current, of heat transference or at least of sub-aqueous manifestations of energy.

To include generative injection of Gfluid into a liquid using a sub-aqueous rotative propulsion turbine.

To include productive return of Gfluid to complete at least one cycle, either as generative condensation and/or as generative fall of liquefied Gfluid.

To increase the efficiency of the system by generative production and storage of energy as hydrogen and oxygen (produced by electrolysis) buoying within liquid and preferably stored under hydrostatic pressurization in flexible chambers.

To transduce buoyancy power of hydrogen and oxygen or any other gases in several cycles in cascade, equivalent of one long deep passageway, of course the first chamber having the highest pressure.

To transduce the pressure from hydrostatic-storage at least by means of floturbines.

To increase the efficiency of the system by utilizing its hydrogen to produce more usable energy.

To transduce buoyancy and also the flow of liquid in falls and currents with about the same turbine structure.

To refrigerate what ever decided in the process of generating energy.

To provide a different way of using Adapted Turbo-Jet Engines (ATJE) for energy conversion since at least some of the ATJEs, coupled to conventional turbines have been experiencing "cracking of the thermal barrier coatings . . . in the hot-gas path" (Power: July/August 1996 P. 5–6).

To provide a more simple floturbine, easier, and cheaper to build, small or big.

To utilize all generative ways from a passageway of energy.

To use as fuel the hydrogen produced such that adapted turbo-jet engines and all the turbines can be rotated for further transduction.

To offer an energy converting system having the possibility of using Gfluids (either considered a gas or a liquid), for transducing their motion power in liquid state and in gaseous state within a liquid.

To offer an energy riffle capable of using either turbines of closeable tube segments or the duct-floturbines shown in this application.

A system capable of substituting the Gfluid according to weather, temperature, law, etc.

To use sub-aqueous turbines capable of transducing the smallest temperature differentials.

To animate the research and development of buoyancy energy plants and in general green energy using sub-aqueous turbines.

Other objects and advantages will become apparent from the specification and drawings.

BRIEF DESCRIPTION OF DRAWINGS

Referring to the drawings which are for illustrative purposes only:

FIG. 1' is a more detailed schematic view of the general preferred embodiment of the present invention showing the pre-heating/refrigerating option.

FIG. 1B' is a schematic side view of an energy passageway using a train-compressor.

FIG. 1C is a schematic side view of a train-turbine positioned for harnessing the substantially horizontal fall of water.

FIG. 1C1 is a schematic upper view of the train-turbine shown by FIG. 1C.

FIG. 1C2 is a schematic upper view of the train-turbine shown by FIG. 1C1 positioned transversally to the flow of liquid.

FIG. 1C3 is a partial cross sectional view of the trainturbine substantially horizontal and obliquely traversed to the flow of liquid as shown by FIG. 1C2.

1D is a schematic side view of a train-turbine positioned for harnessing the substantially horizontal fall of surface water approaching the shores and under surface water leaving the shores.

FIG. 2A shows a perspective close view of a cylindrical subaqueous rotative-propulsion turbine used at least for generative injection of the Gfluid into the impelling liquid of the passageway.

FIG. 2B is a close cross sectional side view of a subaqeous hollow rotative propulsion turbine showing most of its elements including blades.

FIG. 2B' is a close cross sectional side view of a sub-aqueous rotative propulsion turbine showing filled or solid body.

FIG. 2C shows a perspective close view of a conical sub-aqueous rotative propulsion turbine.

FIG. 2D is a cross sectional top view of the sub-aqueous rotative propulsion turbine.

FIG. 3 is a perspective close view of an erected trainturbine using chains and a duct substatially erected within liquid.

FIG. 3A is a side view of an erected trainturbine, bearing structure, heating means and of a rotative propulsion turbine injecting Gfluid into the impelling liquid.

FIG. 3A' is a schematic side view of a floturbine controlling its blades with pivotal sprocket wheels.

FIG. 3B is a side view of a column of the supporting structure, bearings and an option for adjusting distances between rotor.

FIG. 3C is a cross sectional top view of the duct 8 and the blade 7 affixed to chains.

Figure 3D:
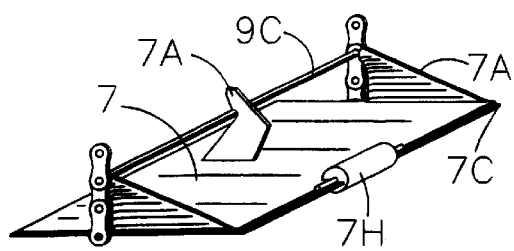
Figure 3L:
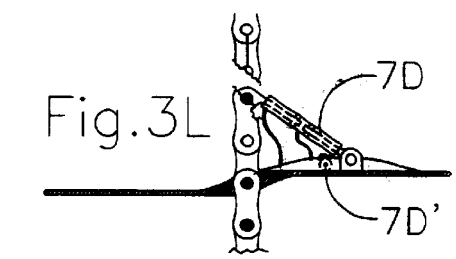
Figure 3E:
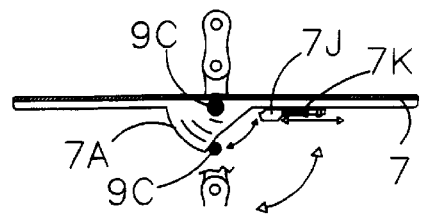

FIGS. 3D, 3E show perspective views of a blade in erected position.

Figure 3J:
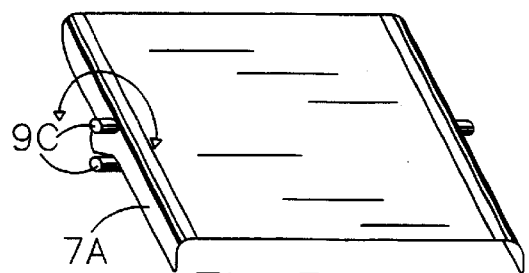
Figure 3H:
Figure 3M:
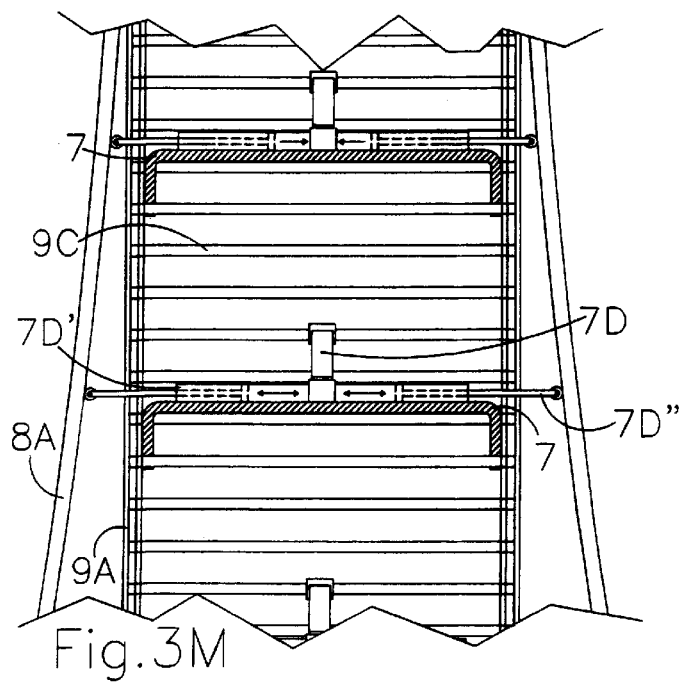
Figure 3F:
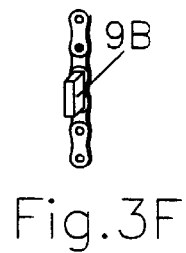
Figure 3G:

FIGS. 3F–3G are partial views of the chain showing the blade-stooping butts.

FIG. 3H is a side view of another blade in erected position.

FIG. 3J is a perspective view of the blade depicted by FIG. 3E.

FIG. 3L is a side view of the blade showing hydraulic actuators.

FIG. 3M is a partial outer view of the chains conveyor showing blades in erected position, cams and hydraulic actuators.

FIG. 4 is a partial perspective view of an erected train-turbine using an endless belt.

FIG. 4A is a partial closer side view of FIG. 4 but basically showing a different meshing way between the rotors and belt, rollers, a hydraulic "door" opener and still another shape for the blades.

FIG. 4B is a cross sectional top view of the duct and the blade hinged to the endless belt.

FIG. 4C is a partial cross sectional top view of the duct 8, a blade and rollers 8C.

Figure 5:
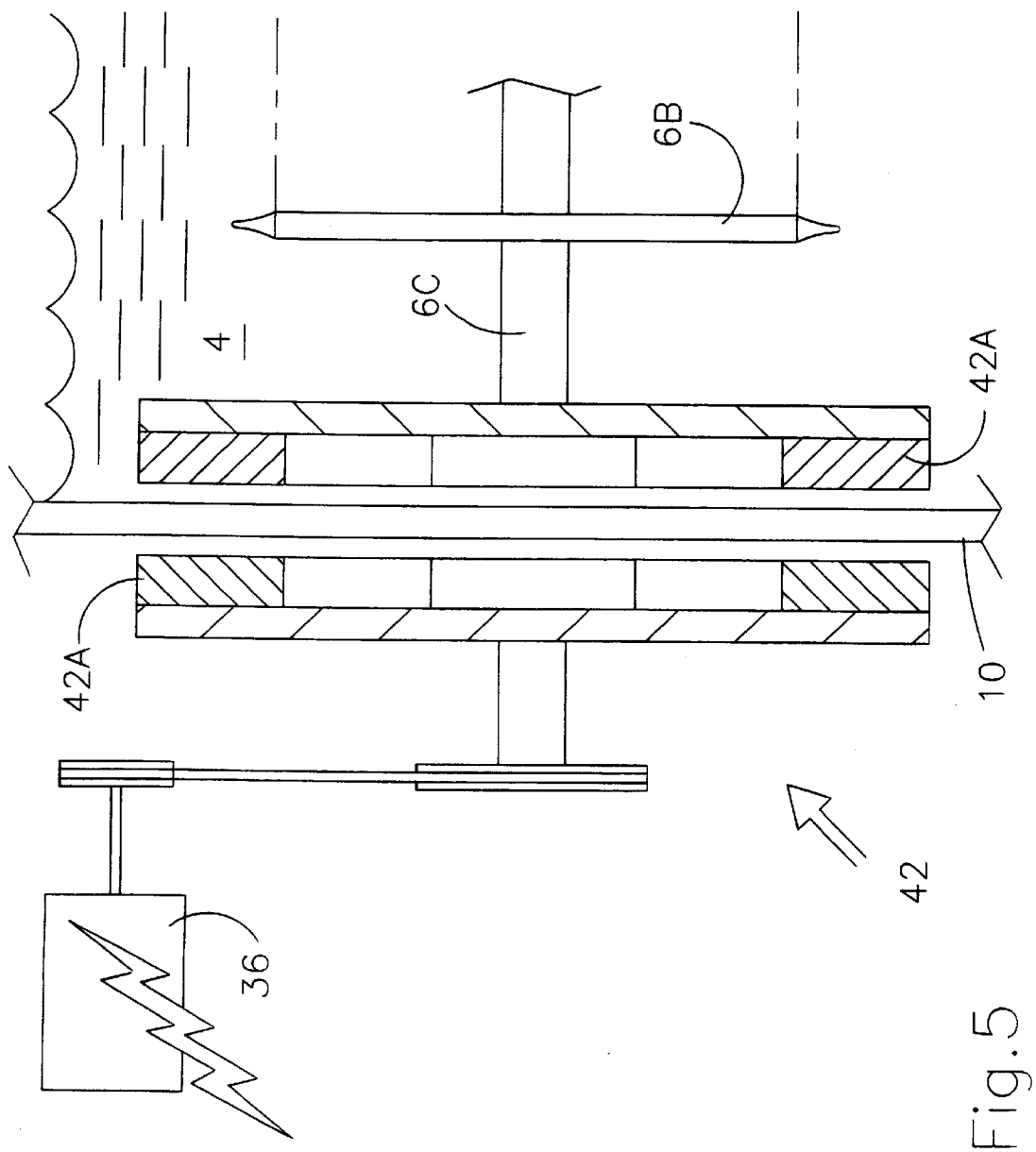

FIG. 5 is a view of a magnetic transmission of rotation.

REFERENCE NUMERALS IN DRAWINGS

| | |
|---|---|
| 2, 2A–2D | Sets of turbines |
| 3 | Rotative Propulsion Turbine (RPT) |
| 3A | Rotative Propulsion Turbine Case |
| 3B | Propulsion Nozzles |
| 3C, 3C' | Bearings |
| 3D | Transmission Shaft |
| 3D' | Wheel |
| 3E | Channel |
| 3F | Chamber or hood |
| 3G | Valve |
| 3H | Pipe |
| 4 | Impelling Liquid |
| 4' | Liquid for chamber 10' |
| 4A | Light ammonia liquor |
| 4C | Buffer liquid |
| 5, 5B | Gaseous generative fluid |
| 6 | Platform |
| 6A | Column(s) |
| 6B | Sprocket Wheels |
| 6B' | Notched Cylinder |
| 6B" | Cogged Cylinder |
| 6C | Shaft of Rotors |
| 6D | Bearings |
| 6E | Screw for adjusting the shafts |
| 6F | Outlet |
| 6F' | Valve |
| 6H | Cylinder Notches |
| 6J | Cylinder Teeth |
| 6K | Column-to-duct links |
| 6M | Pivotal sprockets |
| 6–9 | Floturbine |
| 6–9' | Hydro-turbine |
| 7 | Blades |
| 7A | Blade fins |
| 7B | Hinge's channel |
| 7B' | Blade of hinge |
| 7C | Blade Seals |
| 7D | Hydraulic "door" actuator |
| 7D' | Hydraulic storing chambers |
| 7D" | Cam follower |
| 7E | Blade motive spring |
| 7H, 7H' | Blade rollers |
| 7J, 7J' | Fasteners |
| 7K | Spring |
| 7L | Weight |
| 8' | Rising Length |

-continued

| | |
|---|---|
| 8 | Duct |
| 8A | Duct Inlet |
| 8B | Duct Outlet |
| 8C | Duct Rollers |
| 8D | Duct Inner Wall |
| 8E | Duct Seals |
| 8F | Duct Friction-Reducing film/plaque |
| 8H | Water within duct 8 |
| 9A | Endless Chain (conveyor) |
| 9B | Prismatic-chain-salient stopper |
| 9B' | Cylindrical-chain salient stopper |
| 9C | Chains coupling rods |
| 9D | Endless Belt (conveyor) |
| 9D' | Belt hole |
| 9E | Cleats |
| 10 | Vessel, basin, chamber |
| 10' | Main chamber train-compressor |
| 10A | Accumulator Pressurizing Chamber |
| 10A' | Upper gaseous portion of chamber 10' |
| 10B | Pressure chamber for falling water |
| 10C | Valve |
| 10D | Pipe |
| 10E | Pressure equalizing chamber |
| 10F | Valve |
| 11, 11' | Condensing Section |
| 11A–E | Valves |
| 11F | Pump |
| 11G | Mechanical impeller |
| 11G' | Sea waves pump |
| 12A | Feeding Nozzles |
| 12A' | Feeding pipes |
| 12B | RPT 3 feeding Pipe |
| 12B' | Hydraulic line |
| 12C | Blades for RPT 3 |
| 12D | Bearings |
| 12E | Supporting Plaque |
| 12F | Ring |
| 13, 14 | Cams |
| 15 | Pipe |
| 15A | Pump |
| 15B | Shifting directing valve |
| 15C | Pipe to chamber 10 |
| 16 | Generative Condensation Set |
| 16A | Heat Exchanger |
| 16B | Set of Turbines |
| 16C | Low Temperature Sources (LTS) |
| 16D, D' | Port (valve or nozzle) |
| 16E, E' | Check valves |
| 17A, B | Electric lines |
| 17C | Utilities |
| 18A | Low Heating Chamber (LHC) |
| 18B | Directing or shifting Valve |
| 18C | Absorption chamber |
| 18D | Pump |
| 18E | Compressor |
| 18F | High Heating Chamber (HHC) |
| 18J | Vacuum Pump |
| 19A | Pipe |
| 19B | Directing Valve |
| 19D | Valve |
| 19E | Pump |
| 19G | Pipe |
| 19G' | Pipe |
| 20 | High Temperature Sources (HTS 20) |
| 20A | Adapted Turbo-Jet Engine (ATJE) |
| 20B | ATJE's Hood |
| 20C | Fuel |
| 22 | Heat feeder or loader |
| 24 | Pump from chamber 10 |
| 24' | Directing valve |
| 26 | Separator |
| 27 | Filter |
| 30 | Floats |
| 30A | anchors or columns |
| 32 | Atmosphere |
| 34 | Conventional gas Pressure Turbine |
| 36 | Generators |
| 36' | Transformer |
| 36A | Electrodes |
| 38 | Supporting Structure for Runner 38A |
| 38A | Runner of Conveyor |
| 39A | Hydrogen Production and transduction |
| 39B | Oxygen Production and transduction |
| 39C | Pipe |
| 40 | Stretchable storing chamber |
| 40A | Hydrogen storage |
| 40B | Oxygen storage |
| 40C | Compressor |
| 40D | Air storage |
| 41 | Pressure regulating vessel |
| 41D | Gates |
| 42 | Magnetic Rotation Transmission |
| 42A | Magnets |
| 44 | Vortex turbine |
| 44A | Hood |
| 46 | Compressor |
| 48 | Train-compressor |

SUMMARY

Accordingly, the reader will see that several interdependent transducing passageways or cycles conform the main energy cycle or multi-cycle of the preferred embodiment. The transducing section of each cycle resemble the ancient riffles of mines using a set of turbines for harnessing at least one of the following manifestations of energy: sub-aqueous rotative propulsion, sub-aqueous vortex power, sub-aqueous buoyancy pressure, conventional pressure, pressure of falling liquid and powers of hydrogen and oxygen electrolytically produced by the system. Substantially all former power manifestations are activated and transduced when pressure power of heated stored hydrogen and oxygen is released through the set of turbines and also when such gases are burned for usable energy and clean water.

Figure 1:
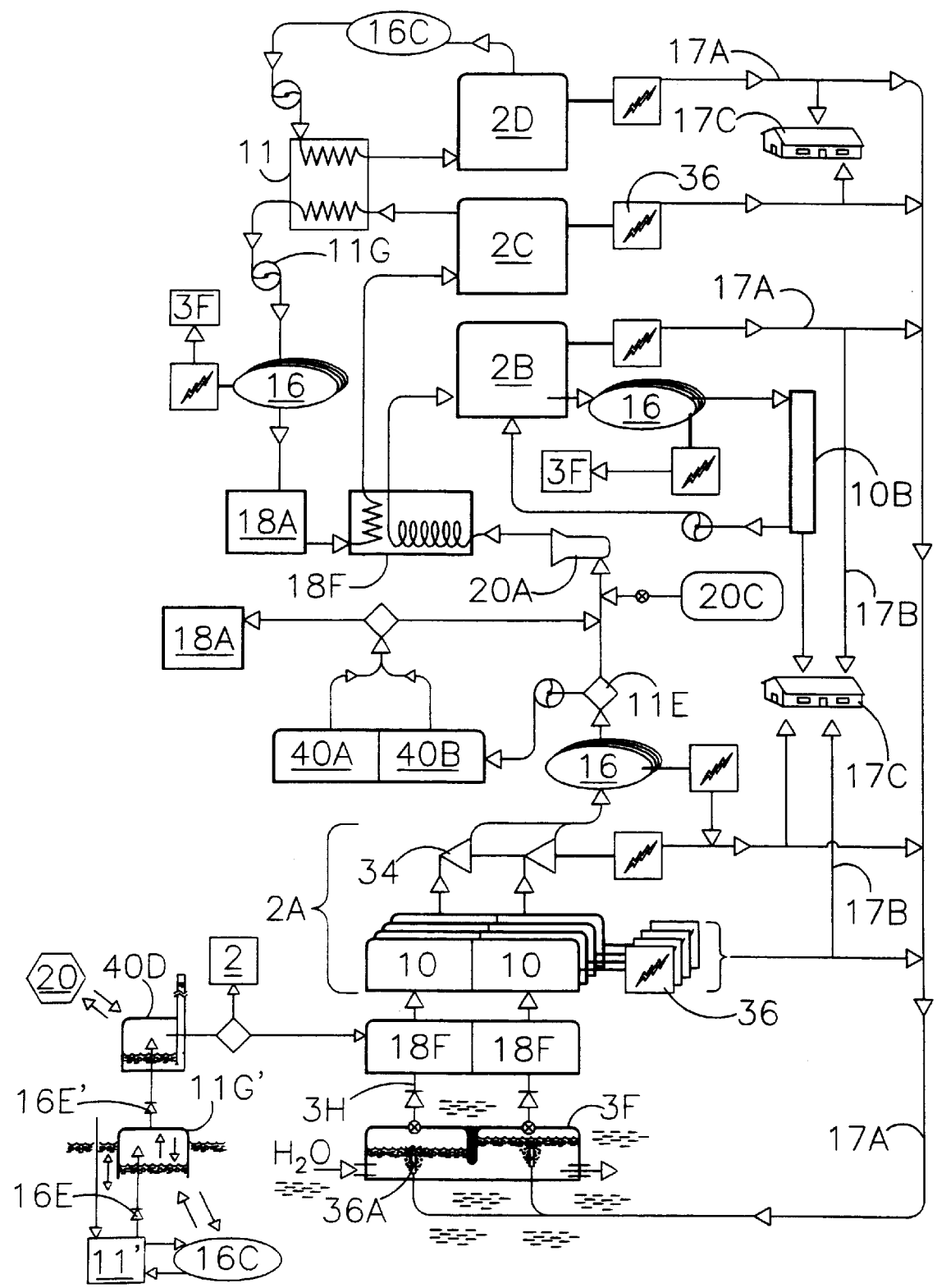
FIG. 1 is a schematic general view of preferred embodiment of the present invention.
Figure 1:
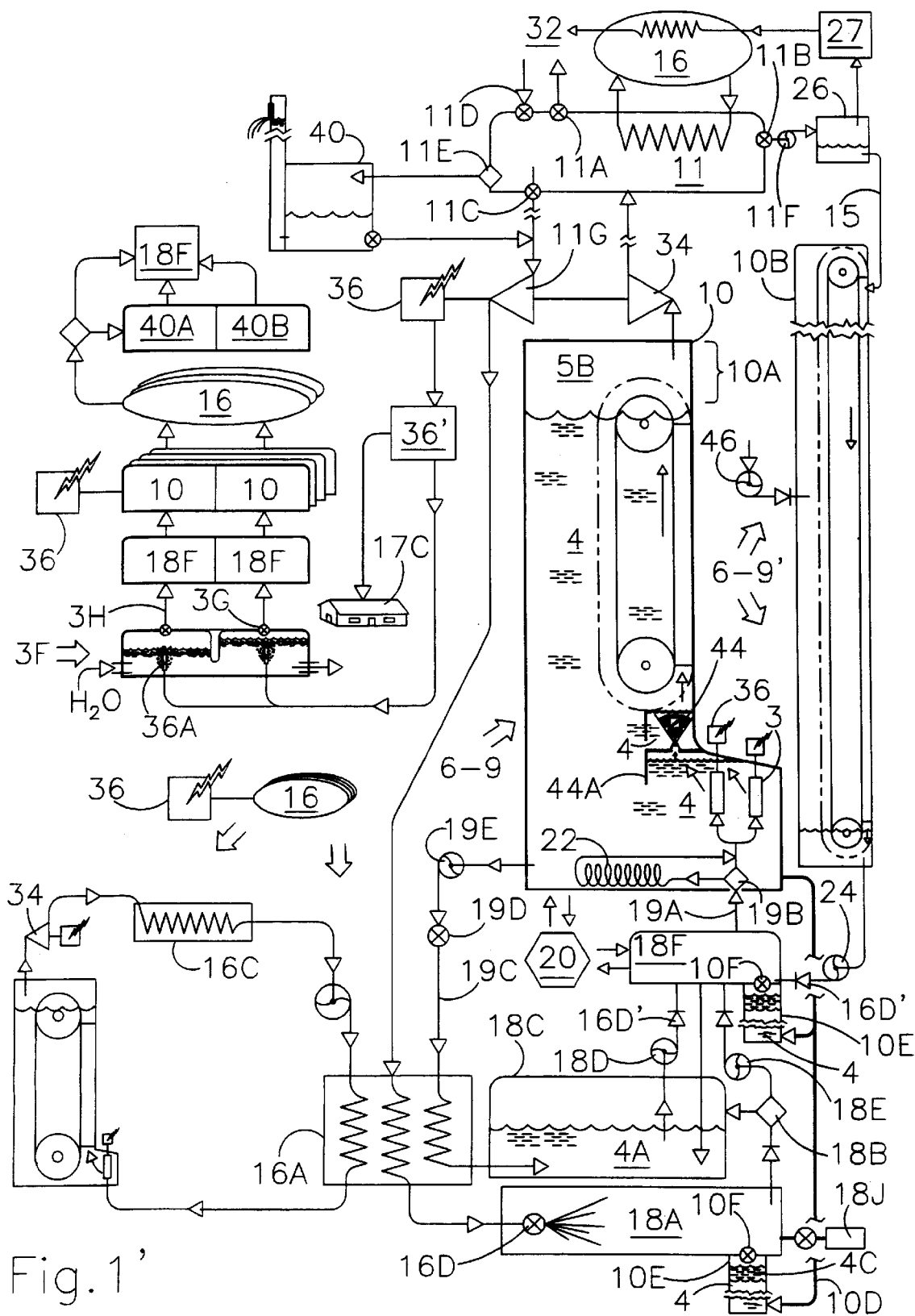

Shown by FIG. 1, the interdependent passageways each define upstream and downstream directions including at least a liquid 4 and turbines for harnessing sub-aqueous powers and optionally conventional gaseous pressure for conventional turbines. Even the fall of water is included at least when water vapor is used as Gfluid. All or some of the electricity generated by the riffle is used for generative production of hydrogen and oxygen by electrolysis thus completing the main cycle of energy.

In a more detailed description (FIG. 1'), the cycles have been designed contemplating the use of Gfluids usually considered gases and/or fluids usually considered liquids.

The system here described can use several cycles on a cascade of temperatures according to the thermal sensibility ranks of several kinds of generative suitable fluids. This is possible thanks to the use of sub-aqueous turbines, more particularly to floturbines.

Each passageway or cycle basically counts with flow generators that energize and drive the Gfluid, conductors or fluid flow controllers for controlling-directing the Gfluid and transducers for energy conversion. A set of several suitable turbines are used as transducers or riffling devices that convert above different manifestations of energy into usable energy.

In a typical cycle of this invention, the flow generators (chosen according to Gfluid's nature and state) drive the Gfluid through the passageway. Its power is riffled or harnessed by the turbines and converted into rotation and generally also into electrical energy. Electricity is in turn converted into hydrogen and oxygen by electrolysis thence generating a kind of sub-aqueous powers (enhanced by heat and transduced at least by sub-aqueous turbines) and conventional pressure (transduced by conventional turbines) before their condensation.

Of course, once without convertible pressure hydrogen and oxygen can be exchanged by another suitable fuel for heating through the high heating means (18F, 20, 20A) of the riffle. In the preferred embodiment hydrogen is used as Gfluid and as a high temperature source or fuel for high heating combustion in furnaces, ATJEs 20A, etc Combustion of Hydrogen actuates an adapted Turbo-Jet Engine (ATJE) 20A and/or gives its heat to HHC 18F. Both ways assure continuous flow of the energy multicycle.

Figure 1A:
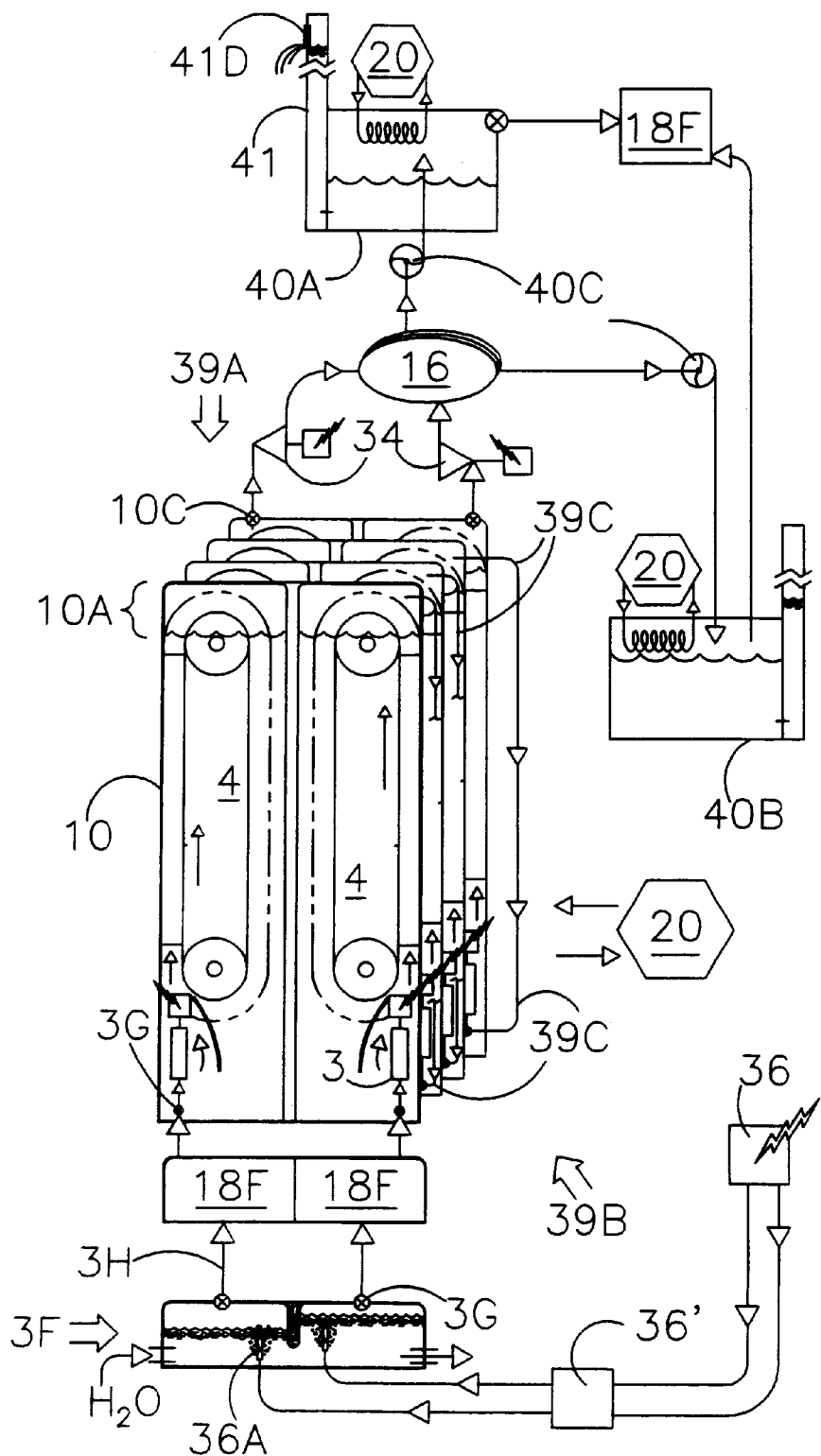
FIG. 1A is a schematic more detailed view complementary of FIG. 1' for the use of hydrogen and oxygen.
Figure 1B:
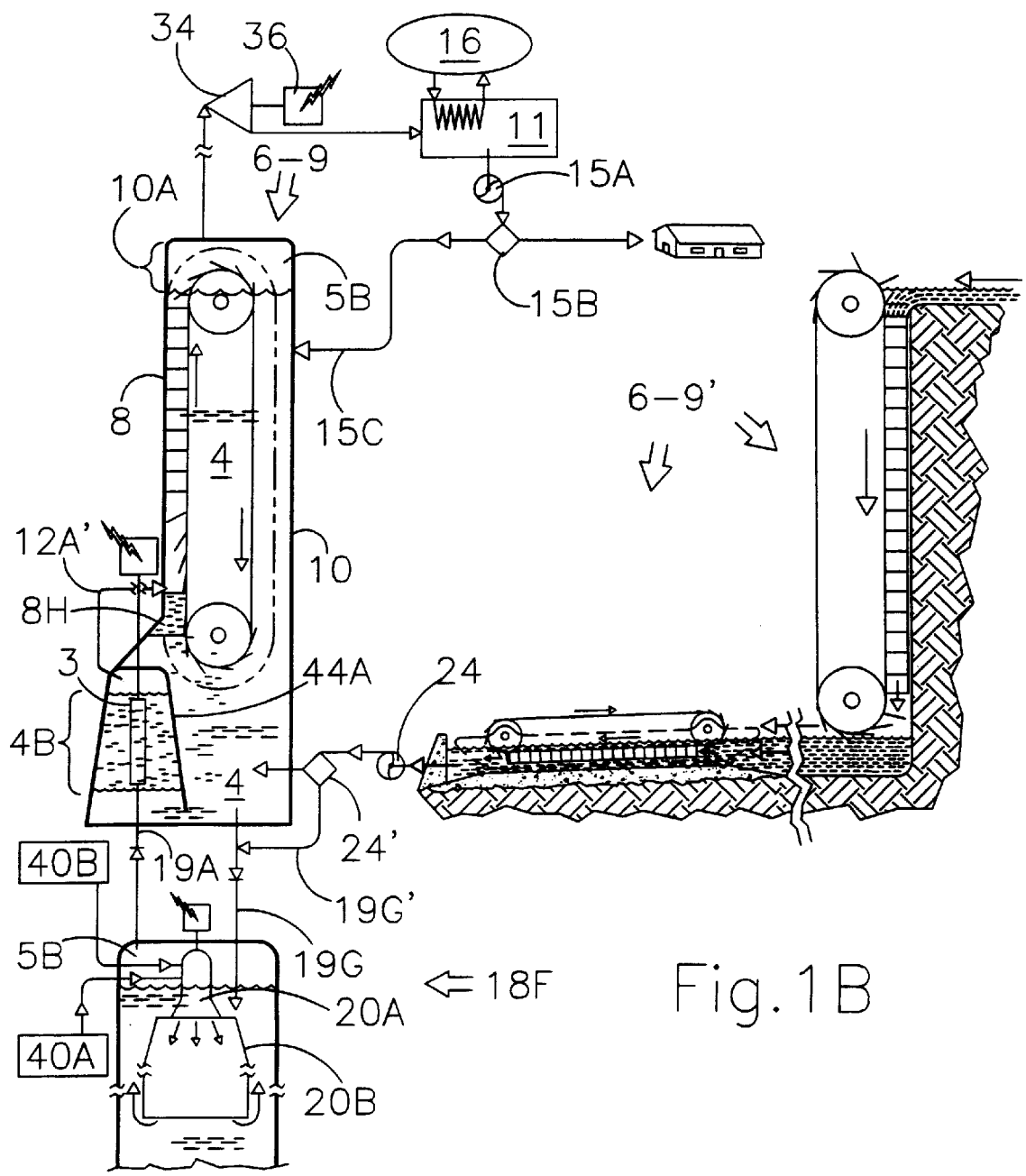
FIG. 1B is a schematic side view complementary of FIG. 1' and used to extend the explanation for the use of water as Gfluid and of hydrogen as fuel of a turbo or adapted turbo-jet engine.
Figure 1B:
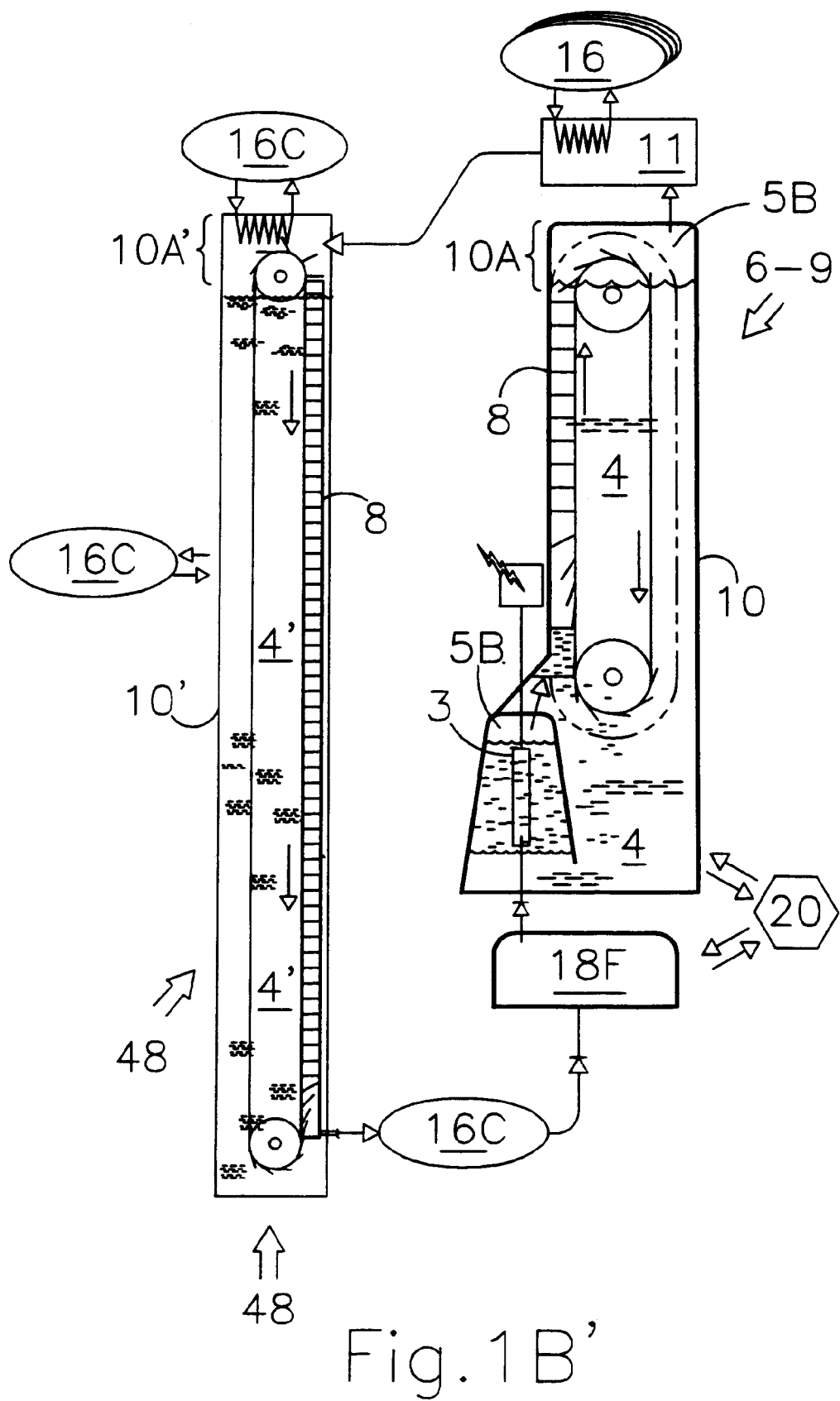

FIGS. 1, 1', 1A, 1B principally show in more detail the general preferred embodiment of this invention. FIG. 1A is complementary of FIGS. 1, 1' and utilized to extend the explanation for generative product of hydrogen and oxygen. FIG. 1B is also complementary of FIGS. 1, 1' and utilized to extend the explanation for the use of water (second energy passageway of FIG. 1) as Gfluid and to complete the inclusion of all the turbines ruffling from the passageway. The other figures show the principal novel elements and/or turbines of FIGS. 1, 1', 1A, 1B.

DESCRIPTION

Some definitions:

The terms "riffle", "riffling", etc. signify means for harnessing the energy of the circulating generative fluid flowing through the energy passageway, as resembling the ancient riffles of mines. According to Webster's dictionary, ". . . some obstruction—the turbines—placed lengthways in a sluice or the like to catch the gold particles—energy—washed out of the —energy passageway—sand or ore".

The term "transduction" and derived words as transducer, transducing, etc. are used meaning the conversion of energy into another form of energy (rotational energy, gaseous or liquid fluid, electric fluid and even energy of hydrogen and oxygen) in the description and the claims.

The transduction includes:

a) generative production of the hydrogen/oxygen b) optional transduction of pressure from pressurized storage of the hydrogen and oxygen, and c) transduction of heat from combustion of hydrogen/oxygen as fuel.

The Generative fluid (Gfluid) can be a liquid, a gas, air or mixture of gasses, gas mixed with water vapor, ammonia vapor, etc. The Gfluid can oscillate between gaseous and liquid state along the passageway. For the portion of the system using buuyancy the Gfluid is in gaseous state. It can be better but not essential that the working Gfluid liquefy as the system will work whether it does or not. The working circulating Gfluid will subsequently be referred also as "gas", "Gfluid", "circulating gas" for both in the description and the claims. Numbers 5, 5B will be used for Gfluid when in gaseous state. Examples of the Gfluid are hexane, water vapor, silicon, air, helium, propane, isobutane, hydrogen, oxygen, carbon dioxide, alcohol, ammonia, methylene chloride, etc., virtually any fluid compatible with the impelling liquid 4 and materials being used. The term "working fluid" is avoided in order to prevent confusion. Falling liquid $H_2O$ is usually the Gfluid for repositioned floturbines or hydro-turbines 6–9' (later explained). A Gfluid can also be a light liquid rising by buoyancy within a heavier liquid and its buoyancy power can be transduced by train-turbines.

The impelling liquid 4 can be water, a combination of liquids or any liquid as oil, diphenyl, mercury, gasoline, fused salts, lithium bromide, etc. that does what water does as described herein, so that the terms "impelling liquid" or "liquid", are used both in the description and claims to describe the impelling liquid, even if its nature is the same as the nature of the Gfluid. The term is meant to encompass all workable liquids for simplicity and clarity of description. The impelling liquid 4, in this case the liquid within enclosures 10, can be substantially standing in a vessel, basin, etc. or be running water in a channel, river, lake, sea, etc. and it is not indispensible to be man-heated. In some embodiments the impelling liquid 4 circulates on its own as part of the heat exchanger function for gaining heat from High Temperature Sources (HTS) 20 (later explained).

Flow generators are natural or artificial means that generate movement of Gfluid (later explained). High Heating section or Chamber (HHC) 18F is used upstream transduction for additionally energizing the Gfluid according to its nature, conditions, etc. and represents any heat or known heating means including the heat of furnaces, "turbos", boilers, etc. for heating the Gfluid either in situ or passed through High Temperature Sources 20 (explained below).

High Temperature Sources (HTS) are 20 present in general any source of heat and/or means for providing heat to the HHC 18F and/or directly to fluids of the system. In example of HTS 20 is the solar farm used by "Lutz international" in the Mojave desert (not shown), the Gfluid would be passed along tubes, each tube heated by by its own heliostate. Of course in embodiments of the energy riffle, treated oil is circulated through solar farms and through chambers as the HHC 18F. Another option (not shown) is to pass the Gfluid through solar rafts, solar ponds, even more conventional solar collectors, geothermal heat, residual and waste heat, man-made boilers, etc.

ATJE 20A is a known jet turbo-compressor or Adapted Turbo-Jet Engine used for generating energy from combustion. It is a flow generator rotated by combustion of hydrogen and oxygen or by any other available suitable gas (as propane). The ATJE 20A by its nature is considered as HHC 18F and/or HTS 20, a heat source and compressor itself in description and claims.

Low heating section or Chamber (LHC) 18A represents any heat exchangers for gradually starting the heating of Gfluid before it enters HHC 18F and/or the liquid 4. The LHC 18A is optionally vacuumed (FIG. 1') for expansion of the Gfluid upon arrival. In such vacuum-expansion LHC 18A has the double function of refrigerating its surroundings and simultaneously gaining heat from them. In addition to other benefits, prevents a temperature shock in the HHC 18F and/or prevents freezing the liquid 4 such that Gfluid is not directly introduced when is able to freeze or provoke a temperature shock. Hence, LHC 18A functions as thermal buffer zone prior to the standing liquid 4 and HHC 18F.

Low Temperature Sources (LTS) 16C (an ellipse in drawings) represent all known means and/or sources for condensing the Gfluid including cogeneration, natural currents (as of wind, of water from sea, lakes, rivers, channels, snow, glaciers etc.) or artificial currents of fluids as in cooling towers and even domestic, commercial coolers in place of or in addition to said cooling towers.

Generative condensation 16 (more detailed in FIG. 1', represented by ellipse) is performed by binary cycles, and signify one or more cycles drawing heat from cycles of higher energy. In this invention represents the withdrawal of heat from a Gfluid downstream transduction by heating a cooler, more thermally sensible Gfluid whose enthalpy is also transduced at least by a sub-aqueous turbine of a binary or Ranking-like cycle. The heat from the second Gfluid downstream transduction "jumps" to energize a third Gfluid in a second condensing chamber. The enthalpy of the third Gfluid is transduced and the cascade continues until the heat "jumps" into final condensation 16C where no more transduction is available. The length of the cascade depends on the quantity of Gfluids manipulable by the thermal differential.

Flotascension in this invention is the displacement Gfluid pushed by an impelling liquid. Flotascension is dynamic buoyancy that caused usually upward movement of a lighter fluid impelled by a heavier fluid. Flotascension phenomenon makes the working Gfluid rise within the heavier impelling liquid 4. In such case, flotascension is due to indirect gravitational pressure or weight of the displaced impelling liquid 4 trying to occupy the side of the displacing Gfluid, according to Archemide's principle, with a force equal to weight of the volume of liquid displayed by the Gfluid. Obviously, the rule for flotascension is to use as Gfluid any substance susceptible of flotascension within the same heavier substance or within a different heavier substance. Flotascension is dynamic flotation, different from the neutral or static flotation of a piece of wood on the surface of a liquid. Flotascension has been noticed in convection currents, aerostatics balloons, steam bubbles rinsing in boiling water, children's balloons full of helium, etc. Flotascension is transduced by the floturbine 6–9 (FIGS. 3, 4, later explained).

Power manifestations: sub-aqueous powers, conventional gas/vapor pressure power, attraction of gravity over a liquefied Gfluid.

Sub-aqueous power manifestations are: sub-aqueous rotative propulsion, sub-aqueous vortex power and sub-aqueous flotascensional power.

Rotative Propulsion in this invention is the propulsion that rotates a rounded device by the ejection of Gfluid through the walls of the same device. Power of Rotative Propulsion within the liquid 4 is due to the ejection of the Gfluid through the sub-aqueous rotative propulsion turbine 3 (explained for FIGS. 2A–D).

Vortex power is energy of the Gfluid helically ejected and helically flotascending within the liquid 4 basically caused by axial uneven channeling or helical injection of powered Gfluid within the liquid.

Power of flotascension is the force of indirect gravitation on light matter rising by buoyancy impelled by a heavier fluid, or gravitation upon the impelling liquid in turn raising the Gfluid therein.

Power of gas/vapor conventional pressure at least in this case is pressure in every direction of usually gaseous heated Gfluid accumulated within fixed walls or barriers, in this case including as a fixed wall the surface of the impelling liquid 4 within a closed chamber 10A (FIG. 1) or HHC 18F (FIG. 1B) when the enclosing chamber is not stretchable. Such liquid surface is fixed for conventional pressure; but in turn, the surface of liquid 4 actuates as a piston for buoyancy pressure as in storing chambers 40, 40A, 40B (FIGS. 1', 1A)

Different from conventional pressure, for buoyancy pressure there is a denser fluid impelling a lighter Gfluid due to gravity. In Examples: in FIG. 1, conventional pressure is accumulated within chamber 10A and optionally rotates a conventional turbine 34 while buoyancy pressure moves the floturbine 6–9. Of course, conventional gas/vapor turbines 34 can be moved either by buoyancy or by conventional pressure, provided a gaseous fluid is rotating it.

A Rotative Propulsion Turbine (RPT 3, closer view in FIGS. 2A–D) is a rounded device rotatively or loosely attached at least to the outlet of a fluid conductor (hood, chamber, pipe). The RPT 3 rotatively ejects-while-injects into the liquid 4 the Gfluid energized at least by the High heating Chamber (HHC) 18F and, according to Newton's laws generates rotational energy. Of course, the RPT 3 generates rotation also within a gaseous medium.

A Vortex turbine 44, FIG. 1' (better shown in applicant's divisional patent application Ser. No. 08/841,691) is a set of blades attached to a common shaft that harnesses the power of a vortex within a liquid.

A Train-Turbine is a turbine made of a conveyor (endless chain, belt, train, transporter) sustained by rotors on bearings, using buckets, plaques, blades or the like which convert into usable energy the flowing power of a Gfluid driven either by direct gravitation (6–9', FIGS 1B, 1C–D) or by indirect gravitional (buoyancy (6–9 , FIGS. 1–1B', 3–3A'). The train-turbine has a harnessing length 8' terminal at is ends by arcuate transition lengths in turn connected by a return length to define the conveyor as substantially continuous and confined to continuous cyclic motion around the rotors 6BC for transducing the power of the Gfluid running through the length 8'.

The train-turbine is positioned and revolves according to the nature, place, surroundings and state of the Gfluid whose power is being transduced. Hence, the below state-of-the art floturbines (including the floturbine to closable tube segments of applicant's cited patent) and hydro-turbines are examples of train-turbines.

A Floturbine (FIGS. 3s, 4s) or flotation turbine is an endless train, chain(s), belt(s) or conveyor sustained by a supporting structure basically composed of at least two parallel rotors vertically spaced apart bore up by columns or walls, and either based on ground or reliably floating in liquid. The floturbine 6–9 uses buckets, blades or the like to convert into usable energy the buoyancy power of a Gfluid rising by indirect gravitation or flotation within the liquid; in this patent application, shown as a duct-floturbine 6–9 (closer in FIGS. 3,4). The floturbine is substantially immersed in a body of liquid 4 and converts buoyancy power to rotational energy. Floturbines are turbines really sensible for transducing very small amounts of heat furnished to gases very sensible to heat.

A Hydro-turbine 6–9' FIGS. (1B–D) is a train-turbine, having substanitally the same structure of a floturbine, but inverted or repositioned for harnessing the power of liquid flowing due to direct gravitation, and even for transducing the power of sea waves (FIG. 1C). Also floturbines of closable tube segments assisted by hood accumulators of Gfluid can be used inverted as hydro-turbine for harnessing the power of falling liquid (as in FIGS. 1B, 1Cs) substantially vertical and/or substantially horizontal.

A gas/vapor conventional turbine 34 in this invention encompass all turbines powered by conventional pressure of matter in gaseous state such as gasses and/or steam. Conventional turbines are used in this invention either as the last transduction device of a passageway, or just downstream HHC 18F sub-aqueously substituting an RPT 3.

A sub-aqueous set of turbines includes at least the RPT 3 and the floturbine 6–9 (FIG. 1A). A set of turbines includes all turbines usable by an energy cycle or sub-cycle as shown by FIGS. 1–1B. In the preferred embodiment are operatively connected at least to electrical generators 36. In other embodiments turbines are connected to compressors, pumps, etc. All turbines are optional, provided at least one sub-aqueous turbine is used.

Chamber 10 represents a lake, dam, container or chamber having a body of liquid 4 surrounding the sub-aqueous turbines.

A train-compressor 48 (FIG. 1B') is basically a floturbine made active inversely for compressing a gaseous fluid within a liquid 4' and a chamber 10'. It can be connected in tandem preferably to floturbine 6–9 by a rotation transmission (not shown).

Pressure equalizing chamber 10E is an optional chamber or valve system presenting the influencing pressure of liquid 4 at its location. It is placed at or downstream injection nozzles or port 16D which feed Gfluid to heating chambers LHC 18A and HHC 18F such that introducing the condensed Gfluid into the heating chambers is substantially equivalent in pressure handling to its injection into the liquid 4; but the Gfluid will receive the heat and start its buoyancy or displacement impelled by the liquid.

A flow generator, activator, or generative impeller cause the cicrulation of Gfluid. Such flow generators are: (a) vacuum of some sections plus (b) condensers 11, 16A and heaters 18A–18F, 20, 20A, (c) mechanical impellers (as compressors and pumps 11F, 11G, 11G', 18D, 48), (d) impelling chambers 10A, 18F, (e) direct (downward) gravitation, as gravity upon water or pressure due to weight, as the fall of a liquid basically within a gaseous fluid being displaced—as in a water fall, an irrigation channel or a river—, (f) absorption—as in chamber 18C, (g) hydrostatic power of stretching storing chambers 40, 40A, 40B (later explained), (h) indirect upward gravitation as buoyancy or pressure due to a heavier fluid or a liquid displacing upwardly a lighter Gfluid as a bubble rising within water (the direct impeller is the liquid 4), (i) electrolytic generation of hydrogen and oxygen and hence, at least of buoyancy, and (j) the thrust and heat exhausted by an ATJE 20A.

The conductors or flow controllers basically include pipes or chambers, check and switching valves, a liquid medium, nozzles, capturing funnels or hoods, ducts or channels, rivers (FIGS. 1C–1C2) and even cables for electric flow between the electricity generators and electrolysis.

The transducers comprise the sub-aqueous transducing set of turbines 2A–D, the ATJEs 20A (fuel into exhaust energized gases) and electrodes 36A (in this invention preferably electric flow into hydrogen and oxygen). Some turbines of the set are positioned within the liquid 4 in a pool, basin, reservoir, channel or chamber 10. Such turbines are: Rotative Propulsion Turbines (RPTs) 3, vortex turbines 44, floturbines 6–9, conventional turbines 34, inverted or repositioned floturbines or hydroturbines 6–9'. In this invention, the RPTs and floturbines are positioned within the liquid 4 (although they can be used also within a gaseous medium for transducing falling liquid).

FIG. 1 is a general representation of a main energy cycle where electric flow is a final product and also is generative of hydrogen and oxygen which are electrolytically generated deep within brine through electrodes 36A substantially within chamber 3F.

Oscillation of sea waves within a Sea-Waves pump (SW-pump) 11G' (later explained) generates pressurized air that is cooled in the same pump 11G' and/or by chamber 11' assisted by LTS 16C. From the SW-pump 11G', the air is channeled toward sets of turbines through an air flow regulating storage 40D where the air can be heated or pre-heated.

SW-pump 11G' is directly connected to the floturbines for starting the system, for co-generation through another set of turbines 2 (as set 2A) and/or for use when all the generated electricity is used by the utilities. It is also connected when necessary due to maintenance provided to the electrolysis system. SW-pump 11G' has check valve 16E to permit the entrance of the air into chamber 11G', a condenser 11' associated to LTS 16C for condensing the air and a check valve 16E' to inject air into storage 40D. Of course, SW-pump 11G' and chamber 40D or any other chamber can be used independently as storage or passageway of a pressurized Gfluid (not only air).

Chamber 3F and long pipe 3H channel the Gfluids through heating in chamber HHC 18F toward a first turbines set 2A (sub-aqueous turbines and gas/vapor conventional turbines) for first transduction substantially at the surface of the liquid or land. Pipe 3H allows heat of surrounding water layers to heat up the Gfluid.

From the first transduction, the Gfluids are passed through generative condensation 16 (later explained) and shifting valve 11E directs them to combustion in ATJE 20A of a second energy passageway; but, when necessary to deviate the Gfluid as to stop the system, valve 11E channels the hydrogen and oxygen to storing chambers 40A, 40B (later explained). From storages 40A–B, the hydrogen and oxygen can be returned toward ATJE 20A or channeled either for pre-heating in chamber 18A and transduction in other turbine sets or channeled for other uses. Of course, the ATJE 20A can also be ran on another fuel 20C (as propane) at least to produce the first amount of hydrogen and oxygen for running the system.

The hot exhaust from combustion in ATJE 20A is sent as a second Gfluid through heat exchangers within HHC 18F (FIG. 1B shows another option for the exhaust of the ATJE 20A). These heat exchangers transfer some of its heat to a third Gfluid of a third energy passageway. In other embodiments, the stored hydrogen and oxygen are used in another energy passageway as shown by FIG. 1B and ATJE 20A (or HHC 18F) is run in another fuel 20C such as propane.

The second hot Gfluid passes through the second turbines set 2B of the second energy passageway for transduction. From transduction, the still hot Gfluid is channeled through second generative condensation 16 where it is liquefied and through transduction as falling water by way of a hydro-turbine within chamber 10B (later explained). Clean water from this passageway is used also for domestic use; thus adding more convenience to the energy riffle.

The pressurized third Gfluid is channeled through the third turbines set 2C. Downstream this transduction, the Gfluid is condensed in a chamber 11 by transferring its heat to a fourth Gfluid of a fourth energy passageway and impeller 11G drives the Gfluid toward the third set of turbines 2C through optional further generative condensation 16, through heating in low heating chamber 18A and high heating chamber 18F.

The pressurized fourth Gfluid is channeled through the fourth set of turbines 2D. Downstream this transduction, the Gfluid transfers its heat to last condensation 16C and is re-cycled through condenser 11 by a compressor for Gfluid in gaseous state or a pump if it is in liquid state.

This cascade of energy passageways utilizes thermaldynamic Gfluids with lower-to-higher thermal sensibility. Downstream compressors and condensers, optionally all energy passageways use a valve system 4C, 10D–F (FIG. 1') upstream the heating means or at the heating means for presenting the influencing pressure of liquid 4 at that zone when vacuuming-expansion is not used. All turbines are coupled at least to generators of electric fluid. Part of the electric fluid is sent to utilities 17C and another part is sent through chambers 3F to continue the production of hydrogen and oxygen. Of course, the hydrogen and oxygen can be exchanged by other fuel suitable for the ATJE 20A.

FIG. 1' explains in more detail the second energy passageway of FIG. 1. In FIG. 1' the Gfluid is circulated in the passageway mainly in gaseous state, at least while flotascending. An impeller 11G (as a mechanical compressor) is used for driving the Gfluid in gaseous state after condensed by Rankine binary cycles 16 in a condenser or chamber 11. Downstream the impelling section 11G and assisted by generative condensation 16, heat exchanging chamber 16A is positioned for additional heat withdrawal. When refrigeration is desired, downstream condensation the Gfluid is optionally expanded through valve or port 16D for its pre-heating in a vacuumed LHC 18A. Otherwise, the LHC 18A only pre-heats the Gfluid. A High Heating Chamber (HHC) 18F downstream LLH 18A or even within the impelling liquid 4, additionally heats the Gfluid for increasing its enthalpy. An impeller 18D or 18E is used when LHC 18A is vacuumed.

The heating device 18A–F represent any means of for energizing the Gfluid insitu producing the heat, bringing the heat to them and/or for passing the Gfluid through distant heat sources.

From the heating devices 18A–F, a rotative-propulsion turbine (RPT) 3 (explained in FIGS. 2D–D) generatively injects the Gfluid into the liquid 4 thus generating rotational energy by reaction according to Newton's laws of motion.

Downstream the RPT 3, at least one hood-accumulator 44A (of the conductors or controlling-directing means) accumulates and directs the Gfluid through other sub-aqueous turbines as other RPTs 3 (now moved by buoyancy) and/or by vortex turbines 44 and/or by a train-turbine for buoyancy: a floturbine 6–9.

The Gfluid 5B is accumulated pressurized downstream the liquid 4 in the upper portion—chamber 10A—of the enclosing chamber 10. Optional conventional gas/vapor turbines(s) 34 is (are) set downstream chamber 10A for transducing the pressure accumulated therein.

Downstream the conventional turbines 34, generative condensation by binary cycles 16 assisted to reduce the heat and pressure of the Gfluid within the condensing chamber 11 before the cycle is repeated through the impellers 11G positioned downstream. The generative condensation is recommended upstream and/or downstream the impellers 11G for better efficiency of the system. All turbines are operatively connected to electric generators. At least a portion of the electricity being produced is used for generative production of hydrogen and oxygen in chambers 3F.
Depending on the size of systems and on the nature of the Gfluid being used, (such as water, alcohol, hydrogen, ammonia, etc.) some elements of the system can be excluded, or exchanged mainly on the flow generators for injection into the heating means and/or the liquid 4 (as explained later). An example of optional exclusion of some elements of the system is when the system is using ammonia the turbine 34 and the impeller 11G are optional since pressure in chamber 10A, condensation, weight of liquid ammonia, absorption in chamber 18C and impeller 18D are then the flow generators. When the Gfluid is water vapor liquefied by chamber 11, the impelling section 11G and LHC 18A are excluded.

At least some of the electric fluid generated by the system is used for electrolytic production of hydrogen and oxygen in chambers 3F. Once produced, these gases are heated by HHC 18F and passed through the transducing section and condensation before its storage and/or further utilization as fuel of ATJE 20A and/or HHC 18F. Such storage is done preferably within flexible hydrostaticly storing chambers 40A–B. Stored pressurized hydrogen and oxygen are heated either in situ by HTS 20 or in the way to chamber 10 by HHC 18F for subsequent transduction. Later, those gases without pressure are optionally burned in the Adapted Turbo-Jet Engine (ATJE 20A), prime mover of the cooperative cycle (FIG. 1B).

More detailed, directing valves 11A–C are used for channeling the Gfluid according to its nature and state. Of course, if the plan of a particular power plant is to use only one Gfluid, only the necessary devices for that Gfluid will be used.

Chamber 11 assists to condense the Gfluid without wasting Gfluid nor its heat and facilitates a drop of pressure for better transduction of upstream turbines. Such drop of pressure is down to atmospheric pressure or less even down to a vacuum. The vacuum in chamber 11 is performed at least by low temperature and the impeller 11G for better energy transduction of upstream turbines.

Compressor 18E, pumps 18D and vacuum pump 18J (the last one positioned as shown or at an absorption chamber 18C) perform the vacuum downstream port 16D. When vacuum and cool expansion (refrigeration) of Gfluid is used at LHC 18A Valve 11C opens for most fluids in gaseous state or fluids generally considered gasses as isobutane, air, etc. and the Gfluid is pressurized by impeller 11G for its stronger condensation in chamber 16A and for injection.

Mechanical impeller 11G is a conventional compressor for gaseous Gfluid or pump for Gfluid liquefied by chamber 11. For its rotation, the mechanical impeller 11G is connected in tandem to conventional turbine 34 and/or to a conventional motor (not shown). In other embodiments (not shown), compressor 11G is operatively connected to an ATJE. Impeller 11G assists further condensation in heat exchanger 16A and pressurizes the Gfluid for its injection into the chambers 18A, 18F and/or into the liquid 4.

When air is being used as the Gfluid, valve 11C is kept open for recycling the air without releasing it into the atmosphere after its condensation in chamber 11. Otherwise, the energy riffle considers the atmosphere as part of the circuit or passageway and valve 11A opens to liberate the air into atmosphere after transduction and condensation. A compressor as mechanical impeller 11G gathers the air from the atmosphere—through the inlet valve(s) 11D, heat exchangers (not shown) in condenser 11 and the valve 11C—and impels it through the passageway for re-circulation.

Should the Gfluid be water (detailed also in FIG. 1B) the still hot but liquefied Gfluid is returned from chamber 11 to HHC 18F through valve 11B and by: (a) pump 11F and/or pump(s) 24 and port 16D' (b) its fall-by-gravitation within a pipe or chamber (not shown) (c) as preferred, flowed by its direct gravity via hydro-turbine 6–9' (later explained) optionally within a substantially erected pipe or chamber 10B, through port 16D' and optimally through pump 24, (d) just its return through pipes as pipes 15C, chamber 10 and pipe 19G (FIG. 1B).

When the Gfluid is an absorbable fluid as ammonia, valve 11C from chamber 11 is open for downstream flow. In other embodiments, liquefied ammonia is simply driven through the heating means without expansion/absorption. Some options to flow the ammonia combines with the use of absorption path 18A–D downstream condensation are (a) use of the impellers 11G (a compressor or a pump depending on the state of the Gfluid), (b) use of gravitation in liquefied ammonia within a pipe (not shown) and pushed by the pressurized chamber 10A (in the second case "b" the turbine 34 and the impelling section 11G are optional) and, (c) as in the preferred embodiment, under a strong vacuum ammonia is flown through conventional turbine 34, is liquefied in condenser 11, passed through valve 11C, through impeller 11G and the vacuum in chambers 18A, 18C.

High and low temperatures enhance the efficiency of the system. More heat increases the volume claimed by the Gfluid to its surroundings and hence the conventional pressure and/or buoyancy pressure that will be transduced. Coldness on the contrary, diminishes the volume claimed by the Gfluid to its surroundings and it causes a vacuum. When the Gfluid is condensed, it is easier, relatively cheap to inject it wherever necessary.

Condensation

The basic importance of cooling the Gfluid is that it creates a drop of pressure downstream the turbines, reduces the backward pressure against the impelling liquid 4, increase the forward flow of the Gfluid through the turbines and reduces the volume of the Gfluid for injection. Hence, condensation basically increases efficiency of transduction and reduces the energy required to introduce the Gfluid into the heating means and/or into the liquid 4 and even into storage.

In this invention, most condensations are generative, assisted by binary cycles 16 or cogeneration (explained below) which withdraw heat from condensers or chambers 11 and 16A. Condensation is performed upstream and/or downstream the impeller(s) 11G. Generative condensation 16 generates by means of binary cycles 16 which draw the heat from the condensing chambers 11 and 16A. Such binary cycles use at least one sub-aqueous turbine for transduction due to their relative low cost and efficiency of harnessing heat. Binary cycles 16 are one or more, one absorbing heat from the other (each time using more thermally-sensible gases) in a cascade of heat and pressure, the last connected to Low Temperature Sources (LTS) 16C.

Downstream condensation and according to its nature, in some embodiments the Gfluid goes out of the pipes or chambers. Particularly for maintenance shutdowns, from chamber 11 the Gfluid is stored under pressure through valve 11E in hydrostatic flexible chamber(s) 40. For the usual re-circulation, the Gfluid flows through heat exchanger 16A, through pipes, check valves, nozzles and/or port 16D (optionally an expansion valve) to the low heating chamber 18A.

Heating

The basic importance of heating the Gfluid is that the heat gained by the Gfluid claims more space for the Gfluid; hence, buoyancy and conventional pressures are enhanced.

Heating devices are positioned downstream condensation and are represented by the Low Heating Chamber (LHC) 18A and High Heating Chamber (HHC) 18F. Such heating devices include pipes or chambers internal or external to chamber 10. Some embodiments heat the Gfluid can be heated within the liquid 4 provided its temperature does not freeze the liquid 4 and it is done at least upstream the turbines for best transduction of its energy.

Low heating chamber 18A functions as thermal buffer zone prior to HHC 18F and the standing liquid 4. In addition to other benefits, the LHC 18A prevents a temperature shock in the HHC 18F and/or prevents freezing the liquid 4 such that Gfluid is not directly introduced when is able to provoke a temperature shock in or freeze the admitting medium.

Optional LHC 18A is also used for refrigerating its surroundings depending on the nature of the Gfluid and its degree of low temperature. For this option, LHC 18A represents any known low-pressure-to-vacuumed heat exchangers in such case used for evaporating or expanding, channeling and pre-heating the condensed Gfluid from heat exchanger 16A. The low-pressure-to-vacuum of LHC 18A is continuously performed by compressor 18E for most gaseous Gfluids or by absorption/impelling means 18C–D when the Gfluid is absorbable as ammonia. A strong vacuum is performed as needed by vacuum pump 18J to assist the circulation of the Gfluid.

When vacuum-expansion-absorption is being used, the valve 18B directs the Gfluid through absorption chamber 18C and a pump 18D into HHC 18F as explained below. When only vacuum-expansion is used, downstream LHC 18A a shifting or directing valve 18B directs the Gfluid to compressor 18E that in turn drives the Gfluid into the HHC 18F.

When vacuum-expansion or absorption are not used, an optional chamber 10E substantially equalizes the pressure at injection point in at least one of the heating chambers 18A, 18F with the pressure within the liquid 4. The chamber 10E contains liquid 4 due to its connecting pipe 10D. At the surface of liquid 4 within chamber 10E, a low freezing point floating layer of liquid 4C (as oil), suitable to the Gfluid and lighter than the liquid 4 is used to prevent contact between a freezing Gfluid and liquid 4. Valve 10F prevents these liquids from entering into the heating chamber(s). In such case, at least valve 18B and compressor 18E are optional and the cold Gfluid is preventively heated by LHC 18A and directed into HHC 18F.

When using a Gfluid absorbable by water such as ammonia, the liquid 4 is water/ammonia or light ammonia liquor. Pipe 19C, valve 19D and pump 19E channel light ammonia liquor from chamber 10 through cooling in this case represented by chamber 16A and into absorption chamber 18C. The pressurized ammonia coming from condensation expands or evaporates through port 16D within LHC 18A. Downstream LHC 18A the switching or directing valve 18B is positioned for directing the ammonia into the absorption chamber 18C whose function is to absorb the ammonia into the light ammonia liquor 4A. If only absorption is used in this cycle, LHC 18A and chamber 18C can be considered one chamber, or one the continuation of the other ad compressors 18E would not be used. Downstream chamber 18C, pump 18D is set for impelling into HHC 18F the heavy ammonia liquor at the surface of a liquid 4A. When the temperature handled by HHC 18F is not very high, some light ammonia liquor is (not heat-evaporated) returned form HHC 18F to absorption chamber 18C.

The HHC 18F downstream LCH 18A and/or condensation, just energizes the Gfluid. The pipe 19A connects HHC 18F to the sub-aqueous rotative propulsion turbine 3 (further explained in FIGS. 2A–2D) within the liquid 4. The directing valve 19B and the hat loader 22 are interposed between HHC 18F and RPT 3 for heating the liquid 4 when needed.

Synthesis of Pressurization, condensation and heating

For most gases handheld as Gfluid, pressurization begins in the impeller 11G, a compressor when the Gfluid is in gaseous state, a pump if in liquid sate.

Preferably rotated by conventional turbine 34, impeller 11G pressurized and re-heats the Gfluid from chamber 11 into heat exchanger 16A for further cooling. The Gfluid having reduced volume preferably in a liquid state and generally having a suitable low temperature is introduced through the port 16D within the pre-heating LHC 18A and collects surrounding heat while preferably serving for refrigeration or air conditioning processes. When the Gfluid is non-absorbable, the valve 18B directs it through compressor 18E and HHC 18F into chamber 10. When the Gfluid is absorbable, the valve 18B directs it into chamber 18C where it is absorbed into the liquid 4A. Pump 18D takes the liquid from chamber 18C through high gasification in HHC 18F toward chamber 10. When no vacuum-expansion is used in LHC 18A, no further impellers 18D or 18E are necessary and the Gfluid just enters into HHC 18F.

Sub-aqueous transduction

The function of the first RPT 3 positioned at the end of pipe 19A is to take advantage of the pressure for injection of Gfluid such that its ejection spins the RPT 3 and generates rotational energy. This generative injection is executed through nozzles 3B (FIGS. 2A–D) on the wall(s) of RPT 3 without harm for buoyancy power, neither for the conventional pressure that rotates conventional turbines 34. Optional conventional nozzles 12A (FIG. 3A) can assist or substitute RPT 3 for Gfluid injection into the liquid 4. Nozzles 12A are also used for such injection directly into the duct 8 (FIGS. 1B, 3A) particularly if it is necessary to prevent prolonged contact between flotascending Gfluid and liquid 4 when Gfluid is directed form a far capturing hoods as hoods 44A (FIG. 1').

When the Gfluid is water, the HHC 18F heats and vaporizes the water. Within chamber 10, the liquid 4 is chemically treated to stand temperatures of at least 100° C. without boiling, therefore assisting to avoid condensation of the Gfluid (steam). This at-least-temperature is changed according to the nature of the impelling liquid, pressure and temperatures being manipulated.

The liquid 4 may keep a selected temperature just to minimize heat transference from the Gfluid while working sub-aqueously and depending on the amount of contact with the hot Gfluid. Nevertheless, transfernec of heat by contact between Gfluid and liquid 4 can be controlled for preventing unprofitable heat transference by laying a hot liquid layer 8H (shown by FIG. 1B) at the duct inlet 8A. Thus, a hood captures and directs the liquid 4 just vaporized and the flotascending steam through a pipe as pipe 12A' (FIGS. 1B', 3A) whose outlet is just downstream the layer 8H within the duct 8. Heat exchangers of binary cycles (not shown) are used to draw off excess heat gained by the liquid 4.

A hood 44A is positioned downstream RPT 3 for aaccumulating the Gfluid and for helical release through one or more nozzles as to make a vortex. A vortex turbine 44 harnesses the helical and flotascensional power of the vortex. Once out of vortex turbine 44 the Gfluid flotascends directed toward and through the duct 8 of the floturbine 6–9 (later explained) which harnesses its buoyancy power.

This duct-floturbine 6–9 is substituted by a floturbine of closeable tube segments (offered in mentioned applicant's patent).

Conventional Pressure Transduction and Recycling

Downstream the liquid 4, the hot gaseous Gfluid 5B is captured accumulated and pressurized within chamber 10A. Chamber 10A includes as a barrier or wall the surface of the impelling liquid 4. If the fluids are fully and inflexibly enclosed by the chamber 10, the conventional pressure of Gfluid 5B would explode the chamber 10A; but instead, such pressure is channeled through conventional turbines 34.

The pressure in chamber 10A proportionally diminishes, but does not disappear the rotational propulsion of RPT 3 nor the buoyancy power of the flotascending Gfluid particularly under proper pressure manipulation and when enough heat is provided. Hence, this facts determine the size and other particular characteristics of the sub-aqueous turbines 3, 44, 6–9 and conventional turbine 34.

Just downstream transduction through the conventional turbine 34, the Gfluid enters low pressure condensing chamber 11. Downstream chamber 11, the Gfluid is directed according to its nature and state: form valves 11A–C, a valve is selected and the Gfluid is sent through: (a) a valve 11C and mechanical impellers 11G for substantially any Gfluid generally considered a gas or combination of gases, (b) a valve 11B and a section for driving the Gfluid in liquid state by manipulating gravity power according to its depth within a substantially vertical pipe (not shown), (c) valve 11A and the atmosphere 32 for cooled air, (d) valve 11B, impeller 11F, a hydro-turbine 6–9' in chamber 10B, pump 24 and valve 16D' for liquefied steam. Valve 11E opens for storing gaseous Gfluid in stretchable chamber 40 at least during maintenance periods.

Water as Gfluid

In FIG. 1', option (d) is used when the Gfluid is STEAM mixed with exhaust gases coming from the HHC 18F being a combustion chamber or an ATJE 20A using a fuel different than hydrogen. A valve 11B opens to let pass the hot gases and hot liquefied $H_2O$ through pump 11F and separator 26. From separator 26 hot polluting gases pass through filter 27 and further generative condensation 16 before released into atmosphere 32.

Water fall re-injection

The hot liquefied water goes from separator 26 to HHC 18F through the substantially vertical pipe or chamber 10B falling down through hydro-turbine 6–9' thus generating more utility to the system. This insulated chamber 10B have air pressurized by a compressor 46 for avoiding the rise of water level and to take more advantage of gravity for re-circulation. Pump 24 is optional when chamber 10B is pressurized, but pipe 15 discharges sub-aqueously within the duct of the hydro-turbine 6–9'. Hence, water is injected from hydro-turbine 6–9' into HHC 18F by a pump and/or by gravity from pressurized chamber 10B.

Producing steam

When conventional gas/vapor pressure turbine 34 are used, the HHC 18F will vaporize the water by supplying heat, at the beginning, additional to the amount that would usually be needed for such turbines 34 at least to compensate the absolute pressure of the hot impelling liquid 4 at the injection point. Once the needed pressure is reached, the rate of heat furnished is only about the amount of heat used to run the selected conventional turbines 34 as conventional thermal energy plants usually do. Hence, size and other characteristic of sub-aqueous turbines, the HHC 18F and the conventional gas/vapor turbine 34 are inter-dependent. Of course, embodiments using only sub-aqueous turbines and vacuum or very low pressure downstream liquid 4 are not subjected to such conditions.

From HHC 18F, the shifting valve 19B deviates the hot Gfluid through heat feeder 22 when necessary to increase the temperature of liquid 4. Thus, downstream RPT 3 the water vapor or Gfluid continues the cycle already explained. After generation and condensation the hot distilled water just repeats the cycle or is manipulated as described for FIG. 1B.

Compared to conventional thermal energy plants, this system provides additional energy from the sub-aqueous manifestations of energy since these manifestations come from source(s) different than conventional pressure. Conventional pressure is only one power manifestation of heat. As shown by FIGS. 1, 1' at least a portion of the manifestations of energy is finally converted to hydrogen/oxygen by electrolysis.

Generative hydrogen/oxygen production and Storage

The Energy Riffle includes the generative production of hydrogen and oxygen by electrolysis which also appears at the bottom of FIG. 1 (although it applies to any other gas produced by electrolysis). Both gases are produced by electrolysis using electrodes 36A within brine in chambers 3F and at least some electric energy from the generators 36. Chambers 3F, suitably pressurized for such electrolysis, accumulate and separetely direct the gases through HHC 18F, the set of turbines, condensation 16 and optional storage in chambers 40A, 40B. Chambers 3F are preferably positioned deep within brine for taking advantage of sub-aqueous high pressure. Deep submarine high pressures favor hydrogen/oxygen production and significantly increase the amount of harnessable energy at the surface. There is no need to place within brine any subsequent chamber 18A, 18F, 10, etc. except the conducting pipes 3H. This energy passageway is further explained in FIG. 1A.

FIG. 1A

FIG. 1A is a separated, more detailed explanation for the use of hydrogen and oxygen of FIGS. 1, 1'. Generative production of hydrogen and oxygen includes the turbine sets or sections 39A, 39B.

Hoods or chambers 3F receives and control brine for electrolysis. Electrodes 36A, immersed in such brine, receive the electricity from generators 36 through transformers 36'. Electrolysis produce hydrogen and oxygen which are accumulated within chambers 3F. Assisted by valves 3G, chamber 3F pressurize, control and channel the hydrogen and oxygen produced from the brine through pipes 3H toward its heating in HHC 18F and to rotate the turbines.

Downstream the HHC 18F, RPT 3 injects and transduces the pressure power of Gfluid accumulated within chambers 3F. As part of the turbine set, vortex turbines (not shown) can be used downstream RPTs 3. A floturbine downstream the RPT 3 transduces the flotascensional power of Gfluid rising within the liquid 4.

As shown by the sequence of chambers 10 in FIG. 1A, the hydrogen and oxygen pass through one or more of a series of transducing sub-cycles or passageway sections one behind the other and similar to frontal sections 39A, 39B and their sets of turbines. Such series of sub-cycles, equivalent to a long deep passageway positooned sub-aqueously, channeling upwardly the Gfluid and transducing its sub-aqueous powers. The first sub-cycle having the highest pressure, the last one having the lowest pressure. The subsequent generative chambers behind and similar to frontal chambers 39A, 39B do not depict any electrodes for electrolysis. Pipes 39C channel the Gfluid from the first frontal chamber 10A to the RPTs 3 of the next generative set or sub-cycle and so on.

Optional conventional turbines 34 are positioned at least downstream the liquid 4 of the last set of turbines for transducing the pressure accumulated within chambers 10A.

Generative condensation 16 is optionally used for lowering the pressure of Gfluids thus creating the beneficial volume diminution and pressure drop for better upstream transduction and for cheaper downstream injection of Gfluid by impellers 40C (optionally in tandem with turbines 34). Among other options, in FIG. 1A the Glfuids are injected into the storing stretchable chambers 40A, 40B. A valve or gate 41D on vessel or pipe 41 controls the amount of pressure and volume accepted by the storing chambers 40A–B. Other embodiments place chambers 40A, 40B without vessel 41 simply as hoods immersed within water. Of course, still other embodiments use more conventional storage.

For re-circulation through sub-aqueous turbines, storage pressure is increased by heating both gases either within storing chambers by HTS 20 and/or when passed through HHC 18F. Otherwise, directly from condensation 16 or through such storage, the hydrogen and oxygen are used for combustion in the ATJE 20A (FIG. 1B) or just as a HTS 20 for the first HHC 18F thus continuing the energy multi-cycle.

FIG. 1B

FIG. 1B is a side view of the energy riffle showing an energy cycle as further explanation or continuation of FIG. 1' in this case exlclusively using water as Gfluid and as liquid 4, resembling the natural cycle of water where atmosphere is part of the energy cycle. A first source of Gfluid or water is liquid 4 from chamber 19 particularly when water is scarce since water in such case is recycled. Liquid 4, assisted by gravity and an optional pump (not shown), enters the HHC 18F at least from chamber 10 through pipe 19G. Pipe 19G converts this chamber 18F in an extension of chamber 10.

Outside chamber 10, water from natural sources is driven into HHC 18F by direct gravity (as one flow generator) through ducts or channels and through hydro-turbines 6–9'. The water is further driven by pump 24 through directing valve 24' and pipe 19G' into HHC 18F.

The water is vaporized by HHC 18F, either by combustion of a furnace or, as depicted, by the exhaust of an ATJE 20A actuated by hydrogen/oxygen used as fuel flowing from the storage 40A, 40B or directly from transduction. The thrust of the ATJE 20A injects its exhaust directly into the liquid 4 within the HHC 18F. The hot exhaust makes steam out of the liquid 4. When the fuel of the ATJE 20A is different than hydrogen, exhaust gases are produced; hence, steam and exhaust gases are manipulated as described in FIG. 1'.

The injection of exhaust gases directly into the water from ATJE 20A is useful for avoiding some actual problems of certain Adapted Turbo-Jet Engines or turbos of some companies ("Power", July/August 1996 P. 5–6) such as the "cracking of a hot gas casing . . . " and ". . . destruction of blade coatings", etc.

The ATJE 20A exhausting directly into the water within HHC 18F has a hood 20B at the ATJE's exhaust and is positioned with the exhaust pointing downwardly such that when it is not working, a gaseous bubble holds the liquid 4 (water) distant from the exhaust and ATJE's interior. The Gfluid (steam) is pressurized within HHC 18F and released toward the step of turbines through pipe 19A.

At the end of pipe 19A, RPT 3 is rotated by the Gfluid ejected into the liquid 4. The Gfluid flotascends and is accumulated by optional chamber or hood 44A and directed through pipe 12A toward the duct 8 of the duct floturbine 6–9 thus generating rotational energy again.

Other embodiments (similar to second cycle FIG. 1, whose ATJE 20A use a fuel different than hydrogen, exhaust through heat exchangers immersed in water within HHC 18F thus leaving some of ATJE's combustion heat therein. Such heat gasifies the Gfluid which flows at least through sub-aqueous turbines. The hot pressurized exhaust gases passed through the heat exchangers are directed as Gfluid for moving another turbines. Combinations are handy.

The floturbine being used can be a floturbine of closable tube segments (shown in applicant's patent).

For resisting heat transference from the duct floturbine, the duct 8 is insulated or not-thermally-conductive. Besides, the duct 8 contains the inner liquid section 8H at the inlet 8A while the steam from upstream turbines is captured by hood 44A and introduced just downstream such water section 8H by pipe 12A. The section 8H in this embodiment is optional and to show that heat losses from steam rising downstream RPT 3 are substantially controlled on its continuous way up. Within hood 44A, a layer of a suitable liquid 4B such as water mixed with salts, low viscosity oil, etc. envelopes the RPT 3.

Downstream the liquid 4, the hot Gfluid is accumulated pressurized in chamber 10A, directed through conventional turbine 34 and passed through condensing chamber 11 assisted by generative condensation 16 which liquefies the water vapor.

Optionally, when water is scarce the still hot liquefied Gfluid is just returned into previous chamber 10 by pump 15A through shifting valve 15B and pipe 15C and passed into HHC 18F through an optional pump (not shown) and pipe 19G. Otherwise, the Gfluid is thoroughly condensed by chamber 11 and taken for domestic use when water is plenty available. Still another option is, as shown also by FIG. 1, to direct the liquefied Gfluid through hydro-turbines 6–9' (within chambers 10A) into the HHC 18F.

Water from high places (dams, rivers, channels, cascades, etc.) is allowed to fall through inverted floturbines or hydro-turbines 6–9' for additional energy generation. In FIG. 1B, the train-turbines positioned substantially vertical or horizontal for harnessing falling liquid, represent a hydro-turbine 6–9'. The water passes from ducts, channels or vessels through pump 24, pipes 19G, 19G' and into HHC 18F to be transformed by heat into gaseous Gfluid. Shifting valve 24' deviates some water into chamber 10 as needed.

FIG. 1B' is a schematic view of an energy passageway basically showing transducing sub-aqueous turbines and a compressing system or train-compressor 48 including a train-turbine and a liquid used as compressor members.

Thermal differentials defined by condensation 16, LTS 16C downstream transducton, and HHC 18F, HTS 20 upstream transduction are the basic flow generators of this energy cycle. The train-compressor 48 includes a floturbine made active inversely within liquid 4 and chamber 10 as it can be connected in tandem to floturbine 6–9 by a rotation transmission (not shown).

The condensed pressurized Gfluid from train-compressor 48 is heated by HHC 18F, passes to sub-aqueous transduction into chamber 10 at least through RPT 3 and floturbine 6–9. Downstream sub-aqueous transduction, the hot Gfluid is accumulated pressurized between the tip of chamber 10 and the surface of liquid 4 in a chamber 10A and passed through an optional conventional turbine (not shown) and/or into chamber 11 where it is first condensed. From chamber 11 the Gfluid is introduced into chamber 10A' at the top of chamber 10' where it is circulated downstream the same or lower temperatures by one or more optional condensing sections 16 or 16S according to the nature of the Gfluid and low temperature tolerance of the liquid 4'. The condensation of the Gfluid facilitates (uses less energy) its introduction into HHC 18F. Of course, condensation 16 can be performed at least partially within chamber 10A, thus avoiding use of chamber 11.

The Gfluid is trapped above the surface of the liquid 4' by the blades and duct 8 of the train-turbine. The blades in this case are erected substantially transversely to duct 8 while downwardly pushing as pistons the Gfluid.

In substitution of a gas not discardable into atmosphere, air can be used as Gfluid provided (a) its heat is harnessed by generative condensation 16 before released unto atmosphere and (b) it is cooled when gotten from atmosphere.

As shown, impelling 11G seen on other embodiments can be substituted by a train-compressor 48. Energy profits are easily evident in FIG. 1B' by comparing the high energy income due to high heat with the low energy costs due to condensation of the Gfluid, particularly when using generative condensation.

Hydroturbines

FIGS. 1C, 1C1, 1C2 show hydro-turbines substantially horizontal for harnessing power naturally generated by direct gravity upon the falling water of substantially horizontal currents in passageways as streams, estuaries, channels, rivers, etc. (usually a section of the natural cycle of water). In other embodiments (FIG. 1D) hydro-turbines harness power from both water-flow directions at the shores or beaches.

FIG. 1C shows a side view of a hydro-turbine 6–9' parallel to the direction of the water flow in a passageway. At least part of each blade of the harnessing length or column pushed by the current of water is positioned underwater. The blades of such harnessing length are optionally enveloped by natural and/or artificial duct 8 channels, or courses.

The supporting structure of these substantially horizontal hydro-turbines use floats 30 (in phantom) operatively connected to fixed anchors or columns 30A (FIG. 1C1) or the like for maintaining the hydro-turbine in place and in optimum level within the running water, hence adaptable to depth variations of the channels, estauries, rivers, etc.

FIG. 1C1 shows an upper view of FIG. 1C where floats 30, attached to anchors 30A, and the remainder of the supporting structure of the hydro-turbine 6–9' are parallel to the current of water in duct 8. Rotation is suitably transmitted to generators 36 by gear boxes, belts, chains, etc., in general from train-turbines since they are powerful, but relatively slow.

FIG. 1C2 shows a top view of the hydro-turbine 6–9' pending from suitable floats 30 of different shapes. This train-turbine is positioned traversed and oblique with respect to the water flowing in the natural duct 8, but not using the artificial duct 8. The water passed through the blade 7 pushing them at oblique angle thus revolving the conveyor, its rotors, rotation transmissors and generators 36.

Following the same principles, positioned perpendicular or at an angle with respect to the current, the blades 7 traversed, optionally concave, can also be moved by wind currents (not shown) provided the return length is aerodynamically freed from wind.

FIG. 1C3 shows a closer partial cross sectional view of the horizontal obliquely traversed hydro-turbine shown by FIG. 1C2. This Figure shows only one column 6A supporting a structure 38 in turn sustaining bearings 6D, rotors 6B and channeling devices or runners 38A that envelope lateral rollers 38B. In this case, the sub-aqueous portion of the conveyor is directed by the runners 38A which prevent lateral unreeling or sliding of the conveyor. Lateral obliquely arriving of water to the hydro-turbine 6–9' would provoke lateral friction between the sub-aqueous conveyor length and runner 38A. Such lateral friction is diminished by the lateral rollers 38B.

A weight 7L along the outer edge of blades 7, gravitation and inertia provoke hydro-turbine blades to adopt their suitable position in or out of the running water.

For hydro-turbines 6–9', the blades 7 do not necessarily pivot to the laid mode since they can move in the erected mode through the air without causing significant friction or turbulence with the air compared with the incoming energy. This is particularly valuable when the hydro-turbine is being used at the shores or beaches (explained for FIG. 1D), estuaries, etc.

FIG. 1D shows a side view of a chains hydro-turbine 6–9' for the shores or beaches. In this case, the blades 7 are kept in their erected position assisted by springs or the like (not shown) positioned at their middle pin, and/or cams 13 and optional ducts 8 for harnessing both water flow directions, the upper or surface water movement approaching the shores or beaches with one column and the lower sub-aqueous movement of water leaving the beaches with the opposite lower column.

FIGS. 2A–D

FIG. 2A shows a perspective close view of the Sub-aqueous Rotative Propulsion Turbine (RPT) 3 used at least for generative injection of the Gfluid into the liquid 4. Of course, generative injection can be done through gas/vapor conventional turbines. The Gfluid is received through pipe 12B and the body or case 3A rotates by reaction when nozzles 3B ejects the Gfluid. The rotation is transmitted to generators at least by a shaft 3D.

According at least to deepness, pressure of liquid at the RPT 3 is relatively higher or lower. Hence, a floturbine system extended horizontally permits to place the sub-aqueous RPTs 3 closer to the surface of the liquid for better results.

FIG. 2B depicts a closer cross sectional side view of the propulsion turbine 3 where the outlet of feeding chamber or pipe 12B is furnished preferably with hydraulic or hydro-static bearings here represented by bearings 3C and 12D for spinning on chamber 12B: Obviously, the way hereby depicted for coupling the pipe 12B and the RPT 3 is only one of many.

FIG. 2B' shows other embodiment o RPT 3 mainly filled or solid except for the channel(s) 3E which direct the Gfluid to the nozzles 3B. Other embodiments (not shown) of RPTs rotate by the pressure of falling liquid ejected through suitable nozzles.

On FIGS. 2A–2D, the propulsion turbine 3 is essentially a rotating-rounded-device or case 3A which ejects Gfluid through nozzles 3B thus spinning the RPT3 with power proportional to its power or ejection. The case 3A of the propulsion turbines 3 is rounded and can be spherical, conical or cylindrical provided it fulfills its function.

The gas 5 pressurized within the case 3A is ejected through nozzles 3B as to spin the case 3A and a shaft 3D on the bearings 3C, 12D thanks to the thrust of gas 5 on the liquid 4 and optional blades 12C. At least the bearings 3C, 12D are pressurized by hydraulic lines 12B'. Blades 12C are united by rings 12F fixedly attached to feeding pipe 12B and/or to a base, floor, footing or support plaque 12E. The rings 12F and the blades 12C can be sustained by or attached to any place provided the gas is directed far from the turbine case 3A. In other embodiments (not shown), the blades 12C are hydro-dynamically shaped, free to rotate by the thrust of Gfluid thus producing harnessable conter-wise rotation power. Still in other embodiments (not shown) the case 3 is fixed and the blades 12C, straight or helical, rotate optionally surrounded by a cylinder or inverted cone for avoiding turbulence. Enough Gfluid flow discards the need for the surrounding cylinder since the surrounding slower liquid and the blades are not in contact. Of course, the rotative blades are operatively connected to rotation transmission means and/or turbines.

Pipe 12B, bearings 3C, 12D and the plaque 12E assist to hold the turbine case 3A at its place. Bearings 3C', at the upper end of blades 12C grasp the shaft 3D thus showing a way of giving more stability to the RPT 3. In other embodiments the RPT 3 is inverted hence coupling with the feeding pipe 12B at its upper end, or is respositioned at different angles. Blades 12C and nozzled 3B are positioned preferably in helicoidal mode around on the case 3A.

The diameter and height of the RPT 3 depend on the decided design, pressure, massive flow, etc. Bigger diameters add torque to the RPT 3.

FIG. 2C shows a RPT 3 of conical shape. Several conical shapes (not shown), one next to the other, can rotate the same shaft and generator.

FIG. 2D shows a cross sectional top view of FIGS. 2A, 2B.

FIGS. 3–3M

FIGS. 3–3M show perspective and side views of a chains floturbine 6–9 within enclosure 10 and closer view of florturbine's components. The means for reinjecting the Gfluid into chamber 10 are the RPT 3 and/or at least one outlet, nozzle or opening 12A on at least one feeding pipe 12A' operatively positioned as to feed the floturbine with the Gfluid through/about the lower end inlet portion 8A of the duct 8.

As shown by FIGS. 3, 3A, the floturbine 6–9 is an endless conveyor substantially submerged in the liquid 4, mounted on, rotationally engaged with and continuously turning around upper and lower rotors 6BC (at least one of each) mutually parallel and confined to a substantailly continuous cyclic movement. The floturbine 6–9 basically establishes an upper and a lower actuated sections joining a return length and a rising column or harnessing length 8'. The harnessing length 8' is surrounded by a fixed substantially vertical erected channel, course or duct 8 having a lower inlet 8A and an upper outlet 8B respectively for receiving and releasing the flotescending Gfluid that revolves the floturbine 6–9. The duct 8 has an inner wall 8D, in this embodiment the wall attached to the supporting structure by linking extensions or column/duct links 6K. The rotors 6BC basically consist of sprocket wheels 6B mounted in parallel shafts 6C, turning on suitable bearings 6D mounted on at least one column 6A or equivalent sustained by a base or platform 6 (in this embodiment, at the top) usually fixed. In other embodiments the platform 6 is a float or is attached to float(s).

The conveyor is, in this case, a conveyor of chains 9A (in other embodiments an endless belt or the like (FIGS. 4A–C)) connected by coupling rods or spindles 9C having blades 7 usually collapsible extending transversely, spaced longitudinally and pivotally affixed by hinges or flexible material to the rods 9C. A cam 14, springs 7E, fins 7A, hollow rollers 7H (FIG. 3C) and even holders 7J–K (FIGS. 3E–H) represent devices for controlling or pivoting the blades 7. The blades 7 pivot between a raised or erected mode within duct 8 ( substaintlaly transversly to same) and laid mode (substantially parallel to the conveyor) when moving outside of the duct 8. The blades 7 in erected mode within duct 8 gain energy. In the laid mode outside of the duct 8 minify energy losses due to friction or turbulence.

To hold the blades 7 at the laid mode, instead of a long cam 14 (all the way as shown) other embodiments (FIGS. 3E, 3H) use a fastener, clip, hook 7J or the like and a shorter cam (not shown). Still other embodiments use, instead of cams, the same fasteners or the like and rotating devices (not shown) as sprocket wheels suitably larger than and parallel to the rotors, of cogs suitably shaped and separated as to push each blade for laying and for raising the blades. The rotating push-releasing devices or pivotal sprocket wheels 6M are positioned outside the conveyor for laying the blades and inside for releasing them. The liquid 4, cam 14 and the motion of the blades specially at the upper rotor pushes down the blades 7 as to assist the fastener 7J to seize them when coming out of duct 8. The trust of ejected Gfluid from nozzles 12A also assists to push each blade up to erected mode. There are many ways to pivot the blades. Those here depicted are simple examples.

During the substantially transversal erected mode, the blades 7 within the duct 8 will be pushed upwardly by the flotascending Gfluid, hence moving the chains and rotors and producing rotational energy transmittable to electric generators, compressors, pumps, etc.

Besides the rolling function particularly on the inner side of the duct outer wall, roller 7H is used as a float along the rising edge of the blade 7 and pivots or assists to pivot the blades to the erected and laid positions. Floturbine blades 7 are partially or wholly hollow for assisting or taking the floating function of hollow rollers 7H.

Then, during the substaintlaly erected mode at least one blade 7 is traversed on the cross sectional area of said erected duct 8 substantially and continuously forming a bucker full of Gfluid buoying upwardly and consequently revolving the conveyor and rotors. In this way the floturbine 6–9 converts buoyancy into rotational energy transmittable to compressors, pumps, electric generators, etc. Electric energy is obtained by rotation transmission means as shafts, gear boxes, chains or even belts not shown) operatively connecting at least one floturbine rotor with generators.

Downstream liquid 4 an outlet 6F exits the pressurized Gfluid from upper chamber 10A through an optional valve 6F' or a conventional turbine (not shown).

FIG. 3A' exclusively shows the inner and outer sprocket wheels 6M for respectively erecting and laying down the blades 7 at the duct-inlet 8A and duct-outlet 8B.

FIG. 3B shows an option for adjusting the chains in a small embodiment by increasing the distance between the shafts 6C by turning a screw 6E attached to the column 6A. Of course, other embodiments would use hydraulic and/or anchoring means (not shown) for the same purpose.

FIG. 3C shows a cross sectional top view of the tube 8 having a blade 7 in transversal erected mode or position.

Some blade controlling devices in this embodiment are represented by springs 7E, fins 7A and hollow rollers 7H. Springs 7E activate the blades 7 toward the erected mode. Another bigger embodiments would use a simplified conventional hydraulic-pneumatic "door" controller 7D (FIGS. 3L, 3M, 4A), mechanical devices as lateral cams, levers, pinions racks (all not shown), etc.

Fins 7A represent a device which assist to stop the pivoting of the blades at a corresponding angle when they are in their erected position. The fins 7A (at least one) are part of or attached to the blade 7 and stop the blades in their pivotal movement either at/against the about frictionless film or plaque 8F, at/against an extra coupling rod 9C ( FIG. 3D) or at/against the chain 9A directly or, as in FIGS. 3F, 3G, against corpses 9B, 9B' salient from the chain, etc. Chains, cables, hydraulic actuators, rods, hooks, the wall of the duct 8 stopping a blade, butts like those used by conventional hinges to stop at a selected angle, etc. can be used to stop the blade 7 at the selected angle. Some embodiments use no fins, but a blade of bigger area than the cross sectional area of the duct 8, hence moving not perpendicularly to the raised mode.

A fixed flexible sealing pad 8E such as Styrofoam or any other suitably flexible material interiorly attached to the duct 8 assist the duct 8 to resist unwanted heat waste and spillage of Gfluid leaking between the duct-walls and the blades. The pad 8E also assist to resist heat transference out of duct 8. According to the design, FIG. 3C also depicts a fastening hinge channel 7B, continuous or segmented, that can be used for pivotally attaching the blade 7 to the spindle or rod 9C. FIGS. 3E, 3J show the spindle or linking rods 9C pivotally holding the blade by holes in their fins or bends 7A. The ways to implement the blades on an endless chain or belt are many. Those hereby depicted are merely examples.

FIG. 3D, additionally to the blades and chains of FIG. 3C, shows a perpesctive view of a blade 7 depicting a roller 7H which can be extended up to the corners of the blade 7 for substantially rolling on the outermost duct-wall and for rolling on the cam 14 (FIG. 3A). When the roller 7H is hollow also functions as a float. Other roller can be used on the opposite edge as to roll also on the inner wall 8D. Continuous or segmented, each roller 7H is attached to the blade 7—or uses sealers—as to resist leakage within duct 8 and to avoid turbulence outside same duct 8. A sealing pad 7C assists the blade to resist spillage. Other embodiments resist friction and spillage with the use of inner rollers on at least one of the walls similar to rollers 8C (FIG. 4A).

In FIG. 3E, the chain is shown substantially at the middle of the blade 7 (suitable also for hydro-turbines). The fins 7A, a bent portion of the blade 7, stop against the coupling rod 9C. The fins 7A appear as extensions of the same blade but bent and suitably cut to stop at the rods 9C. A fastener 7J having a spring 7K is used to seize the blade 7 in position for the laid mode.

FIG. 3F is a perspective view of a chain and a prismatic butt 9B to stop the pivoting of the blades.

FIG. 3G is a perspective view of a chain and a cylindrical butt 9B' to stop the pivoting of the blades.

FIG. 3H shows a cross sectional side view of a different blade 7 with a different kind of fastener 7J' for the laid position and a way to attach the roller 7H.

FIG. 3J is a perspective view of FIG. 3E showing the linking rods 9C salient from the fins 7A.

FIG. 3L is a perpesctive view of a blade and a hydraulic actuator 7D moved by hydraulic charging chambers 7D'.

FIG. 3M is a partial view of the conveyor, in this embodiment of chains 9A, blades 7 in erected mode, mounted on pins or rods 9C, pivoted by hydraulic chambers 7D and 7D' which are loaded by piston-cam followers 7D". Triggering means (not shown) as cam followers, electromagnetic and/or photo-electric means, rods, levers or the like drive the hydraulic chambers 7D, 7D' to raise or lay down the blades 7 respectively when entering and when leaving the duct 8. As shown, the wall inlet 8A functions also as a cam; although cams for charging the hydraulic cylinders 7D and for triggering the cylinders 7D' (and hence the blades) movement can be positioned at any place for the conveyors' path.

FIGS. 4–4C

FIG. 4 is a partial perspective view of a floturbine 6–9 using an endless belt 9D instead of chains. The belt 9D revolves on at least one lower and one upper rotors 6B' having either cogs or, as in this case, indentations 6H on cylinders for meshing with the belt 9D. In this case the belt 9D uses cleats 9E corresponding to indentations 6H to prevent sliding on the rotors 6B'. The belt 9D smoothly slides along inner duct wall 8D. The endless belt 9D counts with rising buoyancy harnessing length surrounded by the duct 8. A number of blades 7 pivotally attached to the belt 9D by hinges 7B' or the like (flexible material at least part of them) swing between the laid mode outside the duct 8 and the raised mode within the duct 8. In this embodiment, fins 7A stop the blades against the belt or the hinge's plaque 7B' attached to the belt 9D.

FIG. 4A is a closer partial side view of the belt 9D having holes 9D' to mesh with clogged cylinders 6B". FIG. 4 also shows rollers 8C between the inner wall 8D and the belt 9D for diminishing friction between them. Clogged cylinder 6B" has cogs 6J thus showing other option to avoid slipperiness between rotors and the belt. Depending on the embodiment the rotor cylinders and the belt can be equipped with rough surfaces and devices to adjust the belt for diminishing slipperiness. In this embodiment, a hydraulic "door" actuator 7D raises the blades 7 within the duct 8.

FIG. 4B is a cross sectional top view of the duct 8 of FIG. 4 showing the belt 9D, cleats 9E, the blade 7 in erected transversal mode, a hydraulic "door" actuator 7D for erecting and/or laying the blades, another kind of rollers 7H', the stopping fin 7A, Styrofoam or any suitable sealer 8E, springs 7E for raising the blade to the erected mode, the spindle 9C within the hinge-channel 7B. A slippery plaque 8F assists the duct 8 to diminish friction with the belt 9D.

FIG. 4C is about the same as FIG. 4B, except that it depicts a top cross sectional view of rollers 8C.

FIG. 5 is a partial frontal view of the floturbine 6–9 operatively connected to a rotation receiver (such as an electricity generator, pump, compressor, etc.) through magnetic rotation transmission 42 using magnets 42A to transmit rotation out of a sealed chamber 10. Also, the floturbine 6–9 operatively connected to electricty generators through well known conventional rotation transmission devices, all positioned within chamber 10 such that chamber 10 is sealed and only the electricity conductors come out of chamber 10. Obviously, in other embodiments the shafts 6C of both rotors 6B or any other shafts connected thereon can be extended out of chamber 10 for rotation transmission provided suitable sealed bearings (not shown) are used when necessary to prevent leakage.

As in the foregoing construction many changes, adaptations and different arrangements can be made without leaving the principles, objectives or intentions here exposed, it is my desire to make clear that all descripted material, text and drawings should be interpreted only as illustrative and not with limitatory character, particularly as defined in the following . . . CLAIMS:

What is claimed is:

1. An energy transducing system comprising:
   means for electrolytically generating hydrogen and oxygen as generative fluid;
   capturing and circulating means including at least one liquid medium; and
   at least one turbine defined by a rotative propulsion turbine for transducing energy manifestations of the hydrogen and oxygen within the liquid medium, said rotative propulsion turbine comprising:
   a) a rounded body within the liquid medium and rotatively connected to a chamber outlet as to spin thereat;
   b) said rounded body having at least one hollow portion vessel or conduct for channeling an energized generative fluid; and
   c) at least one outlet on a wall of the rounded body connected to said at least one hollow portion for ejecting the energized generative fluid;
   whereby the generative fluid is generated electrolytically, captured, directed, and introduced into said liquid medium through said rotative propulsion turbine.

2. The system of claim 1 and further including means for heating said generative fluid.

3. The system of claim 1 wherein said at least one turbine is defined by at least a duct-floturbine immersed in the liquid medium, said duct-floturbine comprising:
   (a) an endless chain belt or conveyor;
   (b) a supporting structure basically composed of at least two parallel rotors vertically space apart bore up by at least one column or wall and sustaining the endless conveyor; and
   (c) a sequence of buckets, blades or the like attached to said conveyor defining an upwardly harnessing length an arcuate length around each rotor a downwardly return length and a duct enveloping the harness length; whereby the generative fluid from the electrolysis is channeled through the duct and rises by buoyancy pusing upwardly the blades generating rotational energy.

4. A rotative propulsion turbine of converting into usable energy at least the power of ejection of an energized generative fluid comprising:
   (a) a mounted body within a liquid and rotatively connected to an outlet of a first chamber as to spin thereat;
   (b) said rounded body having at least one hollow portion vessel or conduct for channeling an energized generative fluid; and
   (c) at least one outlet on a wall of the rounded body connected to said at least one hollow portion for ejecting the energized generative fluid;
   whereby the generative fluid is ejected through the outlet of said first chamber, through the at least one hollow portion and through said at least one outlet into the liquid for generating at least rotational energy.

5. A system including a train-turbine for transducing the pushing power of a generative fluid flowing in an energy passageway therefore defining an upstream and downstream directions, said train-turbine comprising:
   a) rotating means including at least two parallel rotors spaced apart sustained by a supporting structure;
   b) an endless conveyor having an inner side and an outer side, confined to a continous cyclic motion, mounted on said rotors by the inner side;
   c) a plurality of separated blades affixed transversely and at least substantially perpendicular to the conveyor; and
   d) said conveyor defining a harnessing length directly moved by the generative fluid and terminated by arcuated transition lengths in turn connected by a return length;

whereby the energized generative fluid revolves the train-turbine by pushing at least one of said blades thus converting the pushing power of the generative fluid into useful energy.

6. The invention according to claim 5 wherein a course or duct surrounds at least said harnessing length and the generative fluid is flowing in liquid state.

7. The invention according to claim 5 and further including a course or duct surrounding the harnessing length, at least one flow generator and a port for introducing the generative fluid at least into a liquid section of the energy passageway wherein:

the train-turbine is a duct-floturbine positioned substantially vertical within the liquid, the flow of generative fluid flotascends through said harnessing length, and the blades pivot between an erected mode and a laid mode.

8. The invention according to claim 7 wherein said at least one flow generator includes a main heating means for energizing at least the generative fluid.

9. The invention according to claim 8 and further including means for pre-heating the generative fluid upstream said main heating means.

10. The invention according to claim 8 and further including condensing means at least upstream said port at least for diminishing the volume of the generative fluid.

11. The invention according to claim 10 and further including at least one rotative propulsion turbine for generatively channeling the generative fluid.

12. The invention according to claim 11 and further including a hood or chamber downstrem said liquid section of accumulation-pressurizing the hot generative fluid and a conventional turbine for transducing its pressure.

13. The invention according to claim 12 wherein said at least one flow generator is defined by electrolytic means.

14. The invention according to claim 13 wherein said at least one flow generator is defined by an adapted turbo-jet engine and said generative fluid is defined by exhaust gaseous fluids expelled by said adapted turbo-jet engine.

15. The invention according to claim 11 wherein said at least one flow generator is defined by an adapted turbo-jet engine, said generative fluid is heated by exhaust gaseous fluids of said adapted turbo-jet engine and said exhaust gaseous fluids are the generative flood of another energy passagewya.

16. The invention according to claim 10 wherein said at least one flow generator is a train-compressor or substantially vertical sub-aqueous train-turbine having a compressing harnessing-length surrounded by a duct; whereby each bucket or blade of the compressing harnessing length captures generative fluid outside the liquid for compression.

17. The invention according to claim 10 wherein said at least one flow generator is at least one sea-waves pump basically consisting of:

a) a chamber exposed or subjected to up-and-down sea-waves-caused movement and having an inlet and an outlet;

b) a first check valve downstream said inlet; and c) second a second check valve upstream said outlet, whereby downward movement of water inside the chamber draws air through said inlet and the first valve, and upward movement of water inside the chamber ejects air through said outlet and the second valve.

18. A method combining at least a duct-floturbine and at least one second turbine for obtaining usable energy from power manifestations of a generative fluid activated by at least one flow generator in a passageway that has a liquid section and defines an upstream and downstream directions, said method comprising:

a) directing a flow of generative fluid downstream from said at least one flow generator;

b) allowing heat to energize the generative fluid;

c) using the duct-floturbine when the liquid for transducing the flow of the generatiev fluid; and d) transducing at least one additional power manifestation of the generative fluid using said at least one second turbine.

19. A method for producing and transducing different energy manifestations of a generative fluid flowing in a passageway including at least a liquid volume and condensing means, said method comprising:

a) creating flow of generative fluid by using at least one flow generator;

b) channeling the flow of generative fluid toward the condensing means at least through the liquid volume; and c) transducing at least one of said different energy manifestations by placing between said at least one flow generator and the condensing means at least a rotative propulsion turbine.

20. The method of claim 19 including the further step of heating the generative fluid at least before transduction of step (c).

21. A method for converting into useful energy at least one energy manifeststaion of power generated by an adapted turbo-jet engine exhaust used as generative fluid flowing in a passageway that includes a liquid volume and at least a rotative propulsion turbine, said method comprising:

a) discharging the generative fluid substantially direct into the liquid volume, and b) channeling the generative fluid through said liquid volume and the rotative propulsion turbine.

* * * * *